(12) United States Patent
Kumar et al.

(10) Patent No.: US 12,541,336 B2
(45) Date of Patent: Feb. 3, 2026

(54) INSTRUCTION COLOR BOOK PAINTING FOR DUAL-SCREEN DEVICES

(71) Applicant: Microsoft Technology Licensing, LLC, Redmond, WA (US)

(72) Inventors: Kapil Kumar, Bangalore (IN); Robert I. Butterworth, Burnaby (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/814,422

(22) Filed: Aug. 23, 2024

(65) Prior Publication Data

US 2024/0411498 A1   Dec. 12, 2024

Related U.S. Application Data

(63) Continuation of application No. 18/314,814, filed on May 9, 2023, now Pat. No. 12,099,774, which is a
(Continued)

(30) Foreign Application Priority Data

Jun. 29, 2020   (IN) .............................. 202041027628

(51) Int. Cl.
*G06F 3/041*   (2006.01)
*G06F 1/16*   (2006.01)
(Continued)

(52) U.S. Cl.
CPC .......... *G06F 3/1423* (2013.01); *G06F 1/1618* (2013.01); *G06F 1/1681* (2013.01); *G06F 3/0484* (2013.01); *G06F 3/04883* (2013.01)

(58) Field of Classification Search
CPC .... G06F 1/1618; G06F 1/1681; G06F 3/0484; G06F 3/04883; G06F 3/1423; G09F 9/301; H04M 1/0214
See application file for complete search history.

(56) References Cited

U.S. PATENT DOCUMENTS 8,400,564 B2 *   3/2013   Jacobs .................. G06F 1/1686
                                                 345/1.3
9,152,176 B2 *  10/2015   Gimpl .................. G06F 3/0483
(Continued)

FOREIGN PATENT DOCUMENTS

CN           111240515 A     9/2024

OTHER PUBLICATIONS

First Examination Report Received for Indian Application No. 202041027628, mailed on Jul. 9, 2025, 06 pages.

*Primary Examiner* — Joe H Cheng
(74) *Attorney, Agent, or Firm* — Barta Jones, PLLC

(57) ABSTRACT

A dual-screen computing device includes two separate displays that are coupled to an interconnecting hinge. A hinge detector detects movement or position of the hinge, and the positions of the displays may be determined based on the hinge movement or position. The positions of the displays relative to each other may then be used to determine which mode of operation the dual-screen computing device is operating (e.g., tent mode, open, closed, etc.). Additionally, the dual-screen computing device may include various sensors that detect different environmental, orientation, location, and device-specific information. Applications are configured to operate differently based on the mode of operation and, optionally, the sensor data detected by the sensors.

20 Claims, 17 Drawing Sheets

Related U.S. Application Data continuation of application No. 17/671,580, filed on Feb. 14, 2022, now Pat. No. 11,656,830, which is a continuation of application No. 17/000,086, filed on Aug. 21, 2020, now Pat. No. 11,281,419.

(51) Int. Cl.
*G06F 3/0484* (2022.01)
*G06F 3/04883* (2022.01)
*G06F 3/14* (2006.01)

(56) References Cited

U.S. PATENT DOCUMENTS

| | | | | |
|---|---|---|---|---|
| 9,952,743 B2* | 4/2018 | Sirpal | | G06F 3/04847 |
| 10,459,625 B2* | 10/2019 | Seo | | G06F 3/0485 |
| 10,809,962 B2* | 10/2020 | Files | | G06F 3/1446 |
| 11,281,419 B2* | 3/2022 | Kumar | | G06F 1/1649 |
| 11,656,830 B2* | 5/2023 | Kumar | | G09B 5/14 |
| | | | | 345/173 |
| 12,099,774 B2* | 9/2024 | Kumar | | G06F 3/0484 |
| 2001/0038999 A1* | 11/2001 | Hainey, II | | G09B 11/10 |
| | | | | 434/85 |
| 2010/0085274 A1* | 4/2010 | Kilpatrick, II | | G06F 1/1641 |
| | | | | 345/1.3 |
| 2010/0245106 A1* | 9/2010 | Miller | | G06F 3/167 |
| | | | | 345/1.3 |
| 2010/0298032 A1* | 11/2010 | Lee | | G06F 1/1616 |
| | | | | 345/173 |
| 2011/0187662 A1* | 8/2011 | Lee | | G06F 1/1616 |
| | | | | 345/1.3 |
| 2013/0021265 A1* | 1/2013 | Selim | | G06F 3/04883 |
| | | | | 345/173 |
| 2013/0079062 A1* | 3/2013 | Sirpal | | G06F 1/1616 |
| | | | | 455/566 |
| 2014/0101576 A1 | 4/2014 | Kwak | | |
| 2014/0101578 A1* | 4/2014 | Kwak | | G06F 3/017 |
| | | | | 715/761 |
| 2014/0152576 A1* | 6/2014 | Kim | | G06F 3/0412 |
| | | | | 345/169 |
| 2015/0116362 A1* | 4/2015 | Aurongzeb | | G06F 3/1446 |
| | | | | 345/650 |
| 2015/0130725 A1* | 5/2015 | Knepper | | G06F 3/017 |
| | | | | 345/173 |
| 2015/0324002 A1* | 11/2015 | Quiet | | H04N 7/142 |
| | | | | 463/31 |
| 2018/0096624 A1* | 4/2018 | Ward | | G09B 17/00 |
| 2018/0188774 A1* | 7/2018 | Ent | | G06F 1/1616 |
| 2018/0329521 A1* | 11/2018 | Hesketh | | H04N 7/15 |
| 2020/0133339 A1* | 4/2020 | Yildiz | | G06F 1/1626 |
| 2021/0096611 A1* | 4/2021 | Schenone | | H04N 21/4316 |
| 2021/0096675 A1* | 4/2021 | Klein | | G06F 3/04886 |

* cited by examiner

INSTRUCTION COLOR BOOK PAINTING FOR DUAL-SCREEN DEVICES

CROSS-REFERENCE TO RELATED APPLICATION

This application is a continuation application of and claims priority to U.S. Non-Provisional application Ser. No. 18/314,814 now U.S. Pat. No. 12,099,774, entitled "INSTRUCTION COLOR BOOK PAINTING FOR DUAL-SCREEN DEVICES," filed on May 9, 2023, which is a continuation application of and claims priority to U.S. Non-Provisional application Ser. No. 17/671,580 (now U.S. Pat. No. 11,656,830), entitled "INSTRUCTION COLOR BOOK PAINTING FOR DUAL-SCREEN DEVICES," filed on Feb. 14, 2022, which is a continuation and claims priority to U.S. Non-Provisional application Ser. No. 17/000,086 (now U.S. Pat. No. 11,281,419), entitled "INSTRUCTION COLOR BOOK PAINTING FOR DUAL-SCREEN DEVICES," filed on Aug. 21, 2020, which claims priority to Indian Patent Application no. 202041027628, entitled "instruction color book PAINTING FOR DUAL-SCREEN DEVICES," filed on Jun. 29, 2020, the disclosures of which are incorporated herein by reference in their entireties.

BACKGROUND

Today, many aspects of work, learning, and social engagement are performed by applications on modern computing devices. As the digital era has pervaded most of life, the form factor of today's devices have taken on many different sizes and shapes. Laptops and personal computers are being replaced by smaller tablets, mobile phones, digital whiteboards, the virtual- or augmented-reality (VR or AR) wearables, and the like. These modern computing devices typically include a single display screen for interacting with a single user.

Yet, much of today's work, learning, and social engagement is interactive between different people. Teachers need to instruct students, bosses need to explain work tasks to subordinates, parents need to instruct children on rules, and so on. Today's computing devices, while quite dynamic, typically only provide an outlet for users to consume data that is presented by an autonomous application or that that is retrieved from an outside source (e.g., the Internet, electronic mail, etc.). For instance, a child who is working through a math lesson in a learning application may need help with the lesson, but there may not be a teacher around to help. Or, if there is, the parent and child may have to hand the computing device back and forth to view what is on the screen. Forcing the student to consume the lesson alone or having the teacher and child pass the device back and forth during the lesson frustrates the learning process.

SUMMARY

This summary is provided to introduce a selection of concepts in a simplified form that are further described below in the Detailed Description. This summary is not intended to identify key features or essential features of the claimed subject matter. Nor is it intended to be used as an aid in determining the scope of the claimed subject matter.

At least one embodiment is directed to a dual-screen computing device that has at least two separate displays coupled to an interconnecting hinge that allows the displays to rotate relative to one another. A hinge detector detects movement or position of the hinge, and the positions of the displays may be determined based on the hinge movement or position. The positions of the displays relative to each other dictate which mode of operation the dual-screen computing device is operating (e.g., tent mode, flipped-open, closed, etc.). Additionally, the dual-screen computing device may include various sensors that detect different environmental, orientation, location, and device-specific information. Applications are configured to operate differently based on the mode of operation and, possibly, the sensor data detected by the sensors. Some specific applications present different user interface (UI) screens on the displays based on the mode of operation, and may mirror, copy, or display a user input on one display to the other display.

The aforesaid embodiments are described in more detail below, as are additional or alternative embodiments.

DESCRIPTION OF THE DRAWINGS

The accompanying drawings facilitate an understanding of the various embodiments.

DETAILED DESCRIPTION

Figure 1:
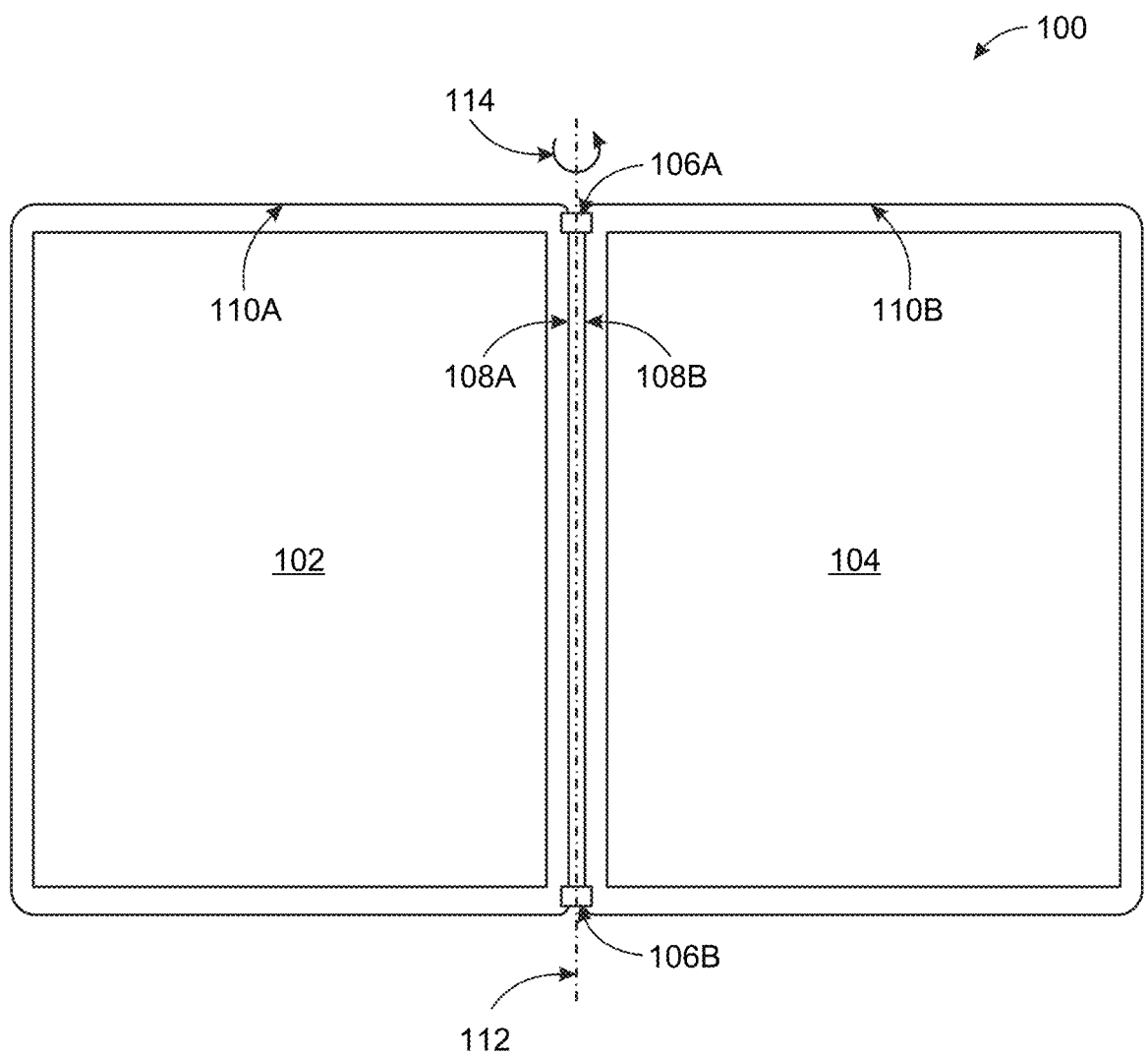
FIG. 1 illustrates a top view of a dual-screen computing device that has at least two separate displays coupled to an interconnecting hinge that allows the displays to rotate relative to one another.

Numerous embodiments are described in detail with reference to the accompanying drawings. Wherever possible, the same reference numbers are used throughout the drawings to refer to the same or like parts. References made throughout this disclosure relating to specific examples and implementations are provided solely for illustrative purposes but, unless indicated to the contrary, are not meant to limit all examples.

Embodiments disclosed herein generally relate to systems, methods, devices, and computer memory for a dual-screen computing device that has two or more displays and one or more hinges therebetween. The one or more hinges are coupled to and join the two displays together along internal sides, thereby delineating an axis of rotation for the two displays relative to each other. In some embodiments, the one or more hinges allow the displays to be folded 360° around each other, from a fully closed position where both displays are facing each other; to a fully opened position where the hinge is rotated 355°-360° and the displays are facing in diametrically or substantially, opposing directions; and every angular position in between (e.g., 1°-359°). A hinge sensor is used to measure the degree of rotation of the one or more hinges to determine the position of the two displays relative to each other. The dual-screen computing device may operate in different modes of operation based on the position of the two displays-determined from monitoring the degree of rotation of the one or more hinges. And applications may perform differently based on the particular mode of operation. For example, different separate user interfaces may be displayed on the displays in tent mode, both displays may be powered off in closed mode, etc.

"Tent mode" is one particular mode of operation for the disclosed dual-screen computing devices. Tent modes involves the two displays being rotated to a position greater than 180° where the displays act as legs that support the device and direct the displays to face in opposite directions. Examples of the tent mode are shown in more detail in accompanying FIGS. 3 and 4. This configuration allows multiple users (e.g., two) to interact with the same dual-screen computing device using separate displays. The different users may be presented with different interactive content that may be used for a myriad of teaching, business, and social purposes. For example, a child may be sitting in front of a first display, and a teacher may be sitting in front of a second display. The teacher may instruct the child to draw a particular image on the first display. As the child draws the image, the real-time drawing strokes may be shown on the first display to the child and also on the second display to the teacher for evaluation. In tent mode, the displays face in different directions-one toward the child and the other toward the teacher-allowing both the teacher and the child to see the drawing in real-time without having to look at each other's display. This greatly enhances the user experience because both can concentrate on their respective tasks uninterrupted: the child on drawing, and the teacher on evaluating.

In addition to being able to operate in tent mode, the disclosed dual-screen computing devices are able to use the detected hinge angle to influence content on the display screens. Displayed content may be stretched when the dual-screen computing device is rotated further open (e.g., the angle between the displays is increased) and/or shrunk when the dual-screen computing device is rotated further closed (e.g., the angle between the displays is decreased). In this manner, the angle between the display devices not only provides different display angles for the users, but the angle also influences and affects the content presented. Conventional computing devices, like smart phones and mobile tablets, do not change content based on multiple display devices being moved. Using the angle of rotation between different display devices provides another way for realistically interacting with content, mimicking the way ink appears on paper, rubber, or other stretchable materials when they are stretched or compressed.

Some embodiments also combine the angle of rotation data monitored by the hinge sensor with other device sensors to change the way content is presented. Numerous sensors may be included, such as, for example but without limitation, an accelerometer, magnetometer, pressure sensor, photometer, thermometer, global position system (GPS) sensor, gyroscope, rotational vector sensor, or the like. Additionally or alternatively, the angle of rotation data may also be combined with peripheral inputs, such as, for example but without limitation, microphones, cameras (e.g., light and infrared), biometric sensors, or the like.

As previously discussed, the dual-screen computing device may operate in different modes of operation, including closed, flipped-open, single viewing, and tent modes. These modes are set once the two displays are folded around the axis of rotation to different positions. "Closed mode" refers to the two displays being rotated into parallel positions and facing each other (e.g., 0°-5° of rotation). "Flipped-open mode" refers to the two displays being rotated all the way open into parallel positions with the displays facing opposite facing away from each other (e.g., 355°-360° of rotation). "Single-viewing mode" refers to both displays being viewable in the same direction and the angel of rotation is less than 175°. "Flat mode" refers to the displays being substantially parallel around 180°. And tent mode, as previously discussed, refers to the two displays being angled more than 180°, facing different directions, and operating as legs propping up the dual-screen computing devices. Thus, the mode of operation is dictated, in some examples, from the angle or rotation between the two displays. Applications running on the dual-screen computing device behave differently based on the mode of operation. For example, one large piece of content may be extended across both display screens when lying flat, but different content may be displayed on different display devices when in tent mode.

Different embodiments use different hinge configurations for rotating the displays. One, two, three, or more hinges may be used, and any of them may be monitored by hinge sensors to determine the rotation of the displays relative to each other. The hinge(s) may be positioned along sides, backs, or fronts of the displays. For the sake of clarity, the singular term "hinge" is used to describe various embodiments, but the term hinge is considered synonymous with the plural term "hinges" throughout this disclosure, and vice versa. In other words, any of the references dual-screen computing devices mentioned herein may use one or more hinges to rotate their dual displays.

It should be noted that examples and embodiments with specific angles of rotation are provided to illustrate various features. These angles are provided merely as examples and are not meant to define all of the disclosed embodiments as to when the dual-screen computing devices are in particular modes of operation. Where appropriate, ranges of angles are provided in this disclosure, but if not, the disclosed angles may vary by ranges of 10° and still be considered as "substantially" within a given angle. For example, a flat mode of operation may be set based on the displays being angled at exactly 180° from each other or substantially at 180° by being within 170°-190° (e.g., 10° more or less than 180°). Similarly, single-viewing mode may be defined between 10°-170°, and the open and closed modes of operation may operate at or substantially at 0°-10° and 350°-360°, respectively. Such ranges are fully contemplated by the examples discussed herein.

Having provided an overview of some of the disclosed examples and clarified some terminology, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 illustrates an example of a dual-screen computing device 100 having two displays 102 and 104 that are rotatable around each other. The depicted dual-screen computing device 100 includes two hinges 106A and 106B that are attached to internal sides 108A and 108B of the displays 102 and 104, respectively. "Internal sides" 108A and 108B are any two sides that are fixed in place to face each other by the hinges. In the depicted example, the internal sides 108A and 108B span lengthwise along the outer casing of the dual-screen computing device 100. Though not shown, alternative embodiments attach the hinges 106A and 106B to the displays 102A and 104 along widthwise sides 110A and 110B.

The dual-screen computing device 100 is shown in the flat mode of operation, with both displays 102, 104 being oriented at, or substantially at, 180°. In this mode of operation, separate content may be displayed on the two displays 102 and 104—e.g., an electronic-mail (e-mail) application open on 102 and a spreadsheet application open on 104. Additionally or alternatively, the same content may be displayed across both displays 102 and 104 e.g., a game with characters that move from display 102 to display 104. The flat mode is but one configuration.

The hinges 106A and 106B define an axis of rotation 112 around which the displays 102 and 104 are able to rotate (or be folded). The hinges 106A and 106B allow the displays 102 and 104 to be rotated around the axis of rotation 112 to numerous different positions, e.g., open, closed, tent, flipped-open, single-view, etc. The disclosed embodiments detect the angle of rotation 114 of the hinges 106A and 106B around the axis of rotation 112. In some embodiments, the angle of rotation 114 is the angular displacement between the displays 102 and 104. In other embodiments, the angle of rotation 114 is the angular displacement of the hinges 106A and 106B from a starting point. Other embodiments combine both.

Figure 2:
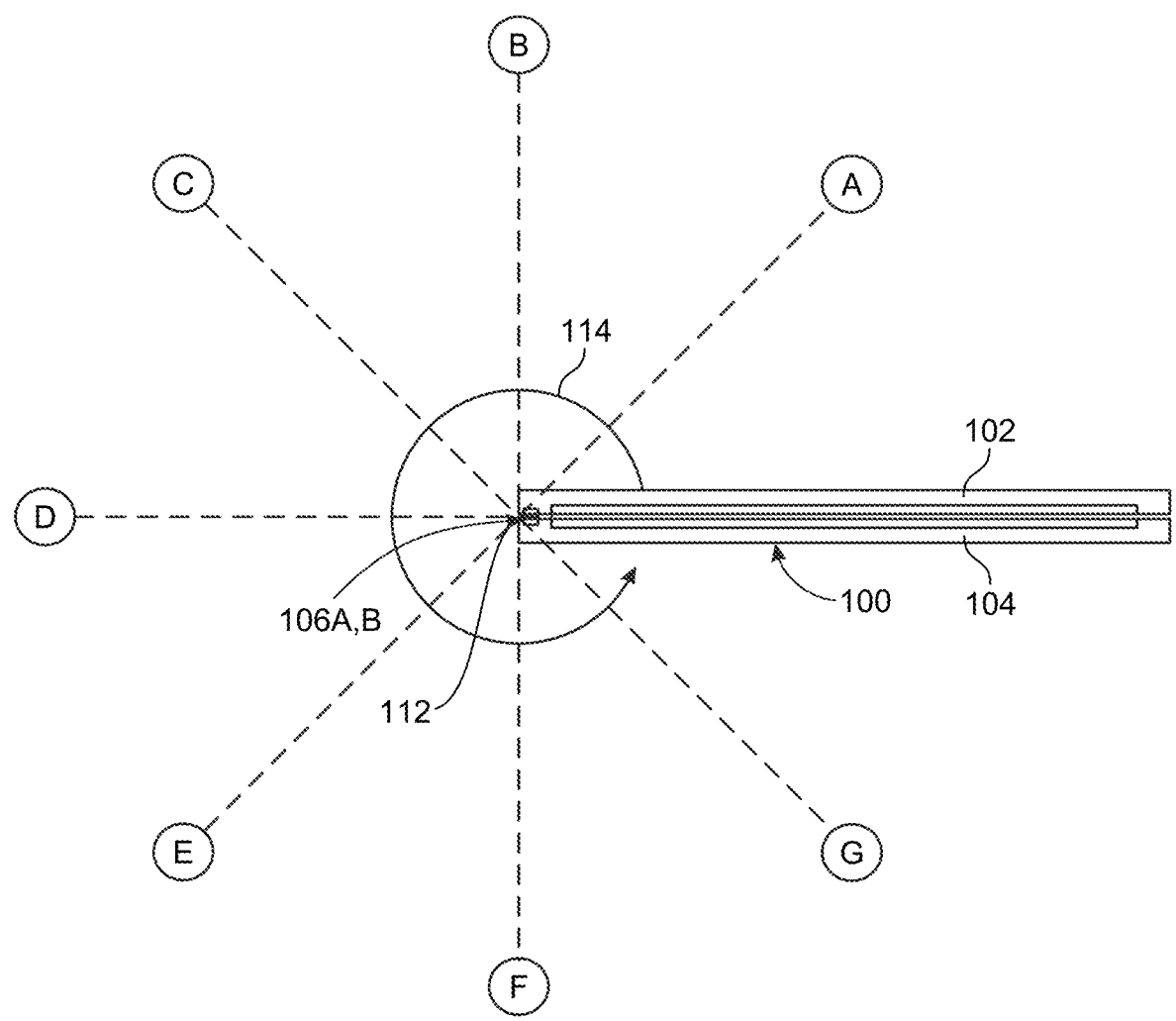
FIG. 2 illustrates a side view of a dual-screen computing device that is foldable over an axis of rotation.

FIG. 2 illustrates a side view of the dual-screen computing device 100 being rotatable around the axis of rotation 112. The hinges 106A and 106B allow the displays 102 and 104 to be rotated around the axis of rotation 112 into different positions. The positions of the displays 102 and 104 relative to each other are detected from the angle of rotation 114 to dictate which mode of operation to operate the dual-screen computing device 100. More specifically, the display 102 may be rotated to positions A-G. At positions A-D, both the displays 102 and 104 are facing in the same visible direction, and therefore may be viewed by the same user. In these positions, the dual-screen computing device 100 operates in a single-user configuration, meaning content is presented for just a single user. At positions, E-G the displays the displays 102 and 104 are facing different visible directions, viewable by different users. These positions E-G represent the tent mode of operation.

Figure 3:
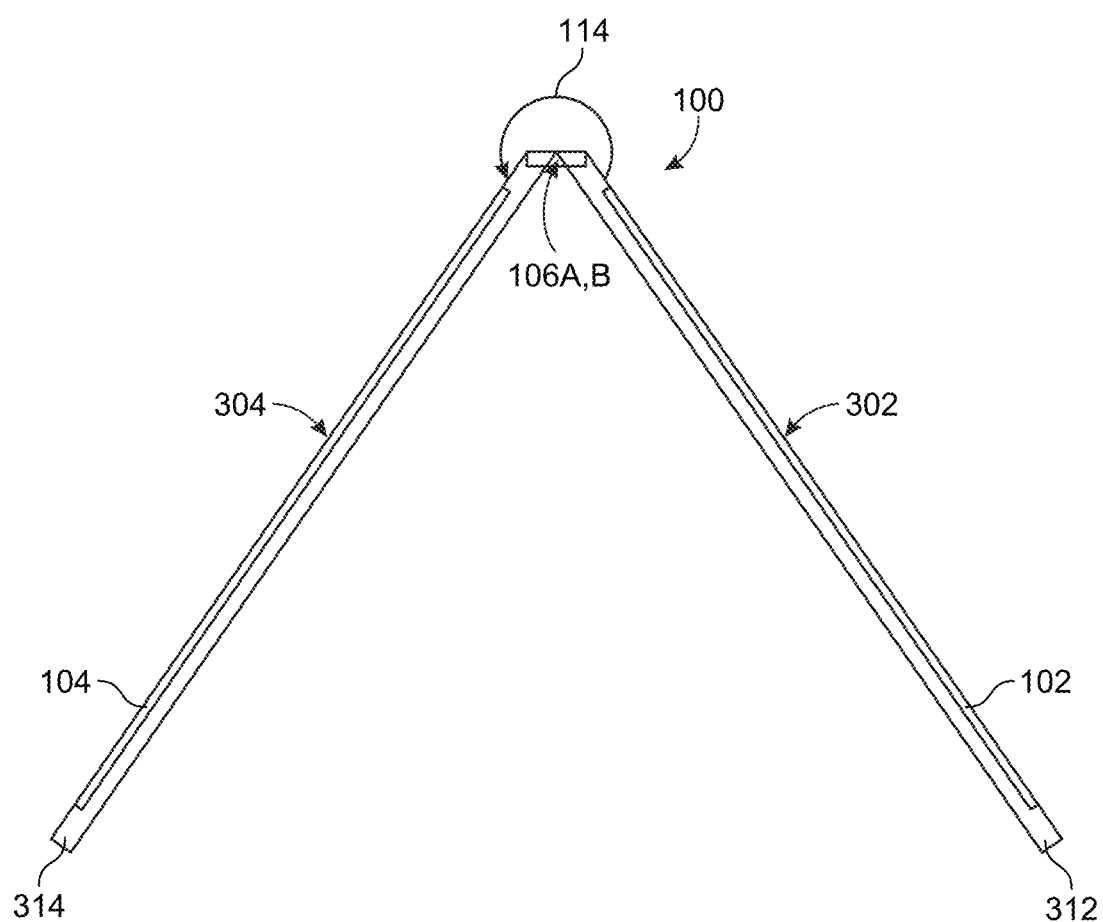
FIG. 3 illustrates a side view of a dual-screen computing device oriented in a tent mode of operation.

FIG. 3 illustrates the dual-screen device 100 in tent mode. As shown, the displays 102 and 104 are rotated into positions to face different viewing directions 302 and 304, respectively. This allows different users to view and interact with the individual displays 102 and 104, creating an ideal configuration for a host of teaching, business, and social applications. To position the dual-screen computing device 100 into tent mode, the displays 102 and 104 are rotated to an angle of rotation 114 greater than 180° (e.g., 225°). Also, the displays 102 and 104 are packaged within their respective casings 312 and 314, respectively, and the casings 312 and 314 act as legs that support the dual-screen computing device 100 in a freestanding position.

Figure 4:
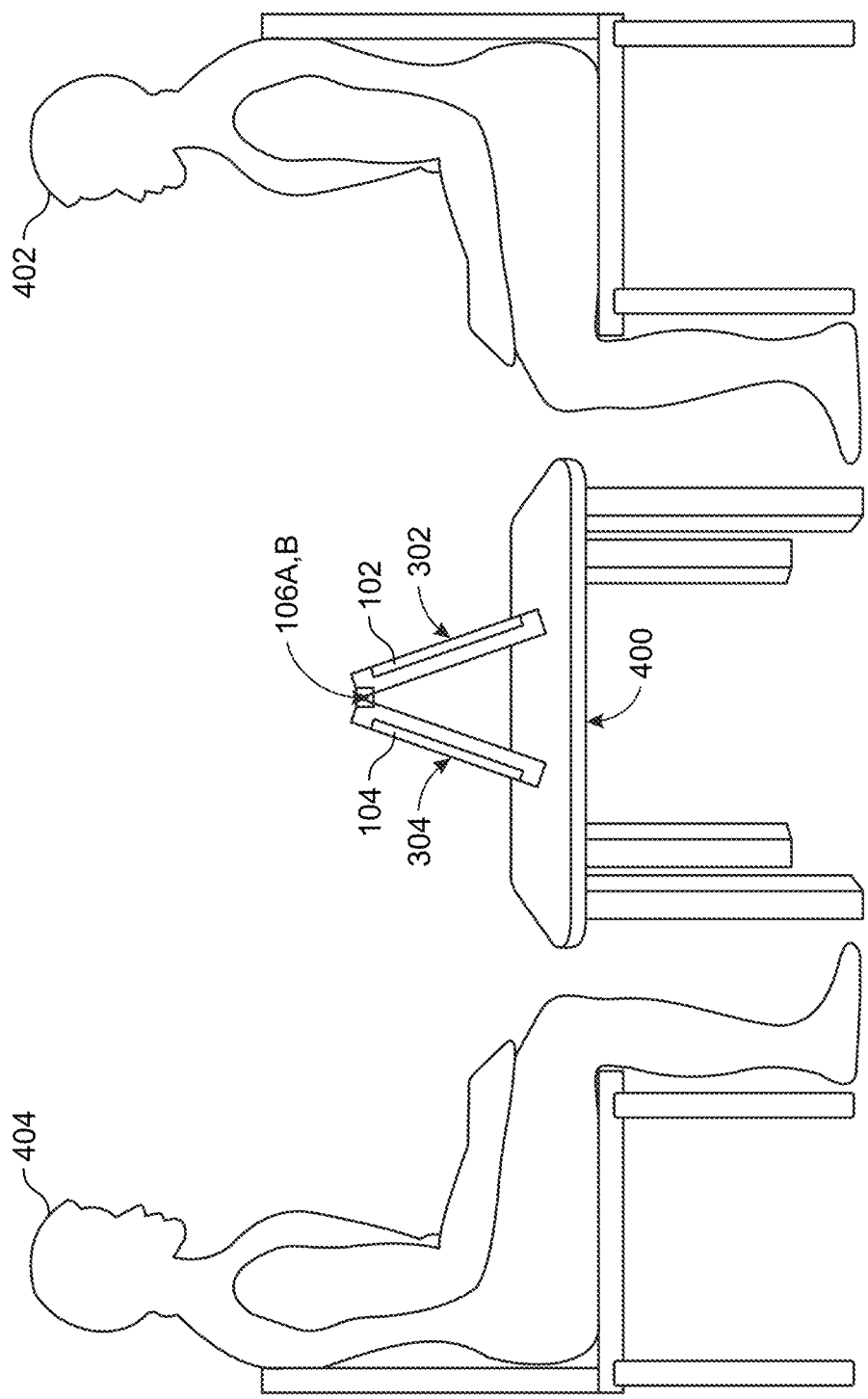
FIG. 4 illustrates a side view of a dual-screen computing device oriented in a tent mode of operation with separate users viewing the displays.

FIG. 4 illustrates the dual-screen device 100 being used in tent mode by different users 402 and 404. Hinges 106A and 106B allow the displays 102 and 104 to be rotated into the tent mode, which allows dual-screen device 100 to rest in a freestanding position on a table 400. The users 402 and 404 are able to view the different displays 102 and 104. As previously discussed, the displays 102 and 104 are angled away from each other in the shown viewing directions 302 and 304, respectively. More specifically, display 102 is angled in viewing direction 302 toward user 402, and display 104 is angled in viewing direction 304 toward user 404.

In this tent-mode configuration, the user 402 is able to interact with display 102, and the user 404 is able to interact with display 104. Operating in tent mode, the dual-screen device 100 may present content on the display devices 102 and 104 than when in other modes of operation (e.g., single-view, flat, etc.). For example, a painting application may present a teaching user 404 with a particular scene to explain to a student user 402 to draw. The full scene may then be shown on the display 104 of the teaching user 404 while the student user 402 tries to draw the instructed scene on the display 102. User input on the display 102 from the student user 402 (e.g., stylus or touch strokes) are shown on the display of the teaching user 404 to assess how well the student user 402 is following instructions. This interaction provides an environment where teachers are able to directly instruct students and evaluate their performance in real time. Thus, the application or drawing application running on the dual-screen computing device 100 operates differently in tent mode—mirroring touches on one display 102 to the other display 104—than when the dual-screen computing device 100 operates in other modes where both displays 102 and 104 are facing in the same viewing direction.

Myriad other uses exist for the tent mode of operation. Users 402 and 404 may play games interactive games together, work on business projects together, consume different media, and engage in various other types of content where it is advantageous to mirror portions of input from one user 402 to the display 104 of the other user 404, and vice versa. For example, users 402 and 404 may be engineering a control system and independently working on different aspects of the design. Contributions from each user 402/404 may be shown in real time on the displays 104/102 of the other user 404/402. Again, numerous uses exist for the dual-screen device 100 operating in tent mode.

Figure 5:
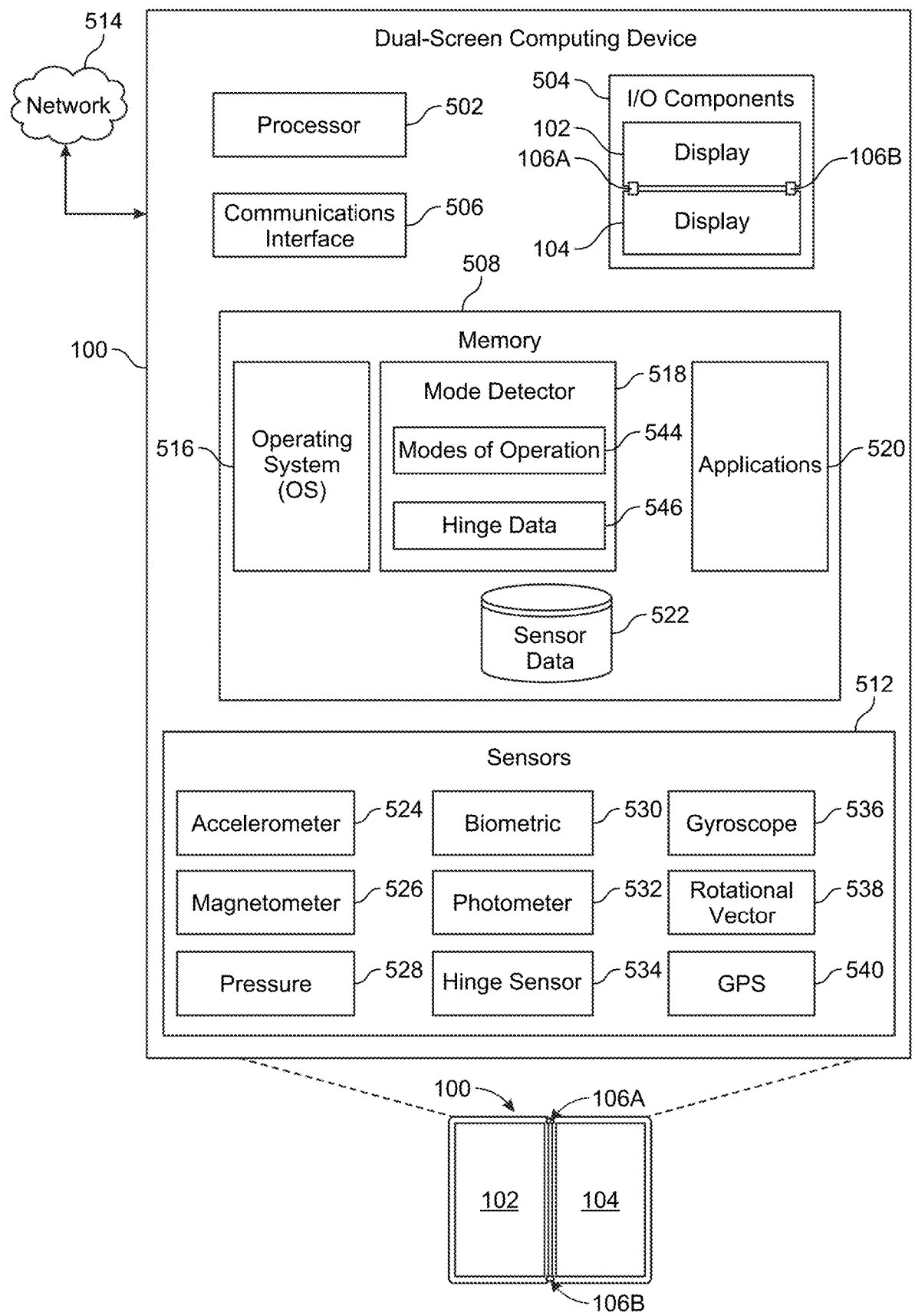
FIG. 5 illustrates a block diagram a dual-screen computing device that has at least two separate displays coupled to an interconnecting hinge that allows the displays to rotate relative to one another.

FIG. 5 is a block diagram of various components of the dual-screen computing device 100. Dual-screen computing device 100 includes one or more processors 502, input/output (I/O) components 504, communications interfaces 506, computer-storage memory 508 (also referred to as computer-storage memory devices), and various sensors 512. The dual-screen computing device 100 is but one example of a suitable computing environment and is not intended to suggest any limitation as to the scope of use or functionality of all the disclosed embodiments and examples.

The processor 502 includes any number of microprocessors, microcontrollers, analog circuitry, systems on chip (SoC), or the like for that are programmed to execute computer-executable instructions for implementing aspects of this disclosure. In some examples, the processor 502 is programmed to execute instructions such as those illustrated in the other drawings discussed herein.

The I/O components 504 may include any type of I/O hardware or software configured to interface with the outside world. Examples include, without limitation, speakers, displays, touch screens, augmented- and virtual-reality (AR and VR) headsets, styli, microphones, joysticks, scanner, printers, wearable accessories, and the like. The embodiments disclosed herein specifically include the two displays 102 and 104 and rotatable hinges 106A and 106B discussed above.

The communications interface 506 allows software and data to be transferred between the dual-screen computing device 100 and external devices over a network 514. Examples of communications interface 506 include a modem, a network interface (such as an Ethernet card), a communications port, a Personal Computer Memory Card International Association (PCMCIA) slot and card, a transceiver for wireless transmissions, radio frequency transmitter (e.g., BLUETOOTH®-branded chip, near-field communication (NFC) circuitry, or the like). Software and data transferred via the communications interface 506 are in the form of signals that may be electronic, electromagnetic, optical or other signals capable of being received by communications interface 506.

The dual-screen computing device 100 is able to communicate over the network 514 with other online devices. The network 514 may include any computer network or combination thereof. Examples of computer networks configurable to operate as network 514 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 514 is not limited, however, to connections coupling separate computer units. Rather, the network 514 may also comprise subsystems that transfer data between servers or computing devices. For example, the network 514 may also include a point-to-point connection, the Internet, an Ethernet, an electrical bus, a neural network, or other internal system. Such networking architectures are well known and need not be discussed at depth herein.

The computer-storage memory 508 includes any quantity of memory devices associated with or accessible by the dual-screen computing device 100. The computer-storage memory 508 may take the form of the computer-storage media references below and operatively provide storage of computer-readable instructions, data structures, program modules and other data for the dual-screen computing device 100 to store and access instructions configured to carry out the various operations disclosed herein. The computer-storage memory 508 may include memory devices in the form of volatile and/or nonvolatile memory, removable or non-removable memory, data disks in virtual environments, or a combination thereof. Examples of the computer-storage memory 508 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other computer memory and/or memory devices.

The computer-storage memory 508 may be internal to the dual-screen computing device 100 (as shown in FIG. 5), external to the dual-screen computing device 100 (not shown), or both. Additionally or alternatively, the computer-storage memory 508 may be distributed across multiple dual-screen computing devices 100 and/or servers, e.g., in a virtualized environment providing distributed processing. For the purposes of this disclosure, "computer storage media," "computer-storage memory," "memory," and "memory devices" are synonymous terms for the computer-storage media 508, and none of these terms include carrier waves or propagating signaling.

In some examples, the computer-storage memory 508 stores executable computer instructions for an operating system (OS) 516, a mode detector 518, various software applications 520, and different sensor data 522. Though shown as separate instructions, the mode detector 518 may be incorporated into the OS 516 in one more OS components. Alternatively, as shown, the mode detector 518 may be a standalone application. Also, parts of the mode detector 518 and the applications 520 may be implemented, at least partially, as firmware, hardware, or software.

The OS 516 may be any OS designed to the control the functionality of the dual-screen computing device 100, including, for example but without limitation: MICROSOFT WINDOWS® developed by the MICROSOFT CORPORATION® of Redmond, Washington, MAC OS® developed by APPLE, INC.® of Cupertino, Calif., ANDROID™ developed by GOOGLE, INC.® of Mountain View, California, open-source LINUX®, and the like. In operation, the OS 516 controls how the dual-screen computing device 100 operates, specifying tasks such as how files are stored, applications are run, memory is managed, interacting with the I/O components 504, and the like.

The mode detector 518 determines the modes of operation 544 of the dual-screen computing device 100 based on hinge data 546 captured by hinge sensor 534, which is one of the resident sensors 512. The hinge sensor 534 detects the movement of the one or more hinges 106A and 106B when the displays 102 and 104 are rotated. In some embodiments, the hinge sensor 534 indicates a distance, position, speed, or angle of rotation that the hinges 106A and/or 106B have moved or been rotated. This information is collectively referred to herein as "hinge data" 546, and is stored in the computer-storage memory 508 with other sensor data 522 and accessible by the mode detector 518 to determine which of the modes of operation 544 the dual-screen computing device 100 is oriented to operate. Additionally, the hinge sensor 522 may be used in the operations of the applications 520. For example, a paint application may stretch or shrink user paint inputs based on whether the displays 102 and 104 are being folded together or unfolded apart.

More specifically, the modes of operation 544 are dictated by the position of the displays 102 and 104 relative to each other. These positions are detected using the hinge data 546, which, again, indicates distance, position, speed, or angle of rotation of the hinges 106A and/or 106B. The positions of the displays 102 and 104 indicate whether the dual-screen computing device 100 is operating in tent, flat, open, closed, or another mode of operation 544. The applications 520 are configured to operate differently in different modes of operation 544. In particular, tent mode provides different application features that are not performed other modes.

The applications 520 may be any type of computer or device applications configured to run on the dual-screen computing device 100. Myriad applications 520 may be run. In some embodiments, these applications 520 change based on the mode of operation 544 of the dual-screen computing device 100. For example, a paint application 520 may behave differently in tent mode than in flat mode. Video and gaming applications 520 may allow different videos and games, respectively, to be played in the separate displays 102 and 104 in tent mode. Conference applications may use different cameras in tent mode.

The dual-screen computing device 100 may also include other sensors 512 in addition to the hinge sensor 534. A non-exhaustive group of sensors 512 is illustrated that includes an accelerometer 524, a magnetometer 526, a pressure sensor 528, a biometric sensor 530, a photometer sensor 532, a hinge sensor 534, a gyroscope 536, a rotational vector sensor 538, and a global positioning system (GPS) sensor 540. Some of the sensors 512 may be combined into a single sensor chip. The depicted combination of sensors 512 is but one example. Additional or alternative sensors 512 are used in different embodiments. In operation, the sensors 512 capture the sensor data 522 that is stored in the computer-storage memory 508, and the sensor data 522 may be used to modify operations of the different applications 520, as discussed in more detail below. The applications 520 may take into account, use, or modify operations based on the sensor data 522 from the sensors 512.

The accelerometer 524 captures the acceleration force of the dual-screen computing device 100 in the x, y, and/or z directions. Such sensor data 522 to detect whether the users 402 and 404 are traveling in a car, airplane, bike, or otherwise moving. If so, applications 520 may estimate the arrival time of the users 402 and 404, provide alerts of nearby attractions while the two are gaming, send messages to business colleagues at known arrival destinations, or otherwise change the behavior of running applications that track movement of the users 402 and 404. Additionally, acceleration force information from the accelerometer 524 may be used by the applications 520 to determine that a user is in a car, on a plane, on a train, or otherwise moving in a vehicle, and consequently changes the information provided on one or more both displays 102 and 104.

The magnetometer 526 is a low-powered vector or total-field magnetic sensor capable of detecting magnetic fields either in aggregate or in two or three dimensions. Examples of magnetic sensors that may be used include, without limitation, a Hall effect sensor, a giant magnetoresistance (GMR) sensor, a magnetic tunneling junction (MTJ) sensor, an anisotropic magnetoresistance (AMR) sensor, and a Lorentz force sensor. In operation, the applications 520 may perform differently when the dual-screen computing device 100 senses a threshold magnetic field, either in the aggregate or in particular directions, indicating another computing device (e.g., smart television, Internet of Things device, wearable, etc.) is within a particular proximity (e.g., 0.5, 1, 3, etc. feet or meters). For example, the applications 520 may show particular content on a smart television that is detected by magnetic signaling. Or, in tent mode, learning or video applications 520 may use the magnetic field information from the magnetometer 526 to wirelessly transmit content on one display 102 to a nearby smart device (e.g., television) that is detected.

The pressure sensor 528 detects pressures. In particular, the pressure sensor 528 may take the form of a transducer, a capacitance-type sensor, micromachine silicon (MMS) sensor, microelectromechanical system (MEMS) sensor, a chemical vapor deposition (CVD) sensor, or other type of sensor capable of detecting pressure. The threshold level of sensed magnetism necessary for the applications 520 to transmit location signals may be correlated to the distance other computing devices or structures are from the dual-screen computing device 100. For example, applications 520 may only transmit particular content or signals when a field of more than 4 Gauss is sensed, because a 4 Gauss field correlates to a particular distance of a device.

The pressure sensor 528 may take the form of a transducer, a capacitance-type sensor, micromachine silicon (MMS) sensor, microelectromechanical system (MEMS) sensor, a chemical vapor deposition (CVD) sensor, capacitive-touch sensor, infrared sensor, or other type of sensor capable of detecting pressure. In some examples, pressures of touches on the displays 102 and 104 may be used in numerous ways by the applications 520. Painting applications 520 may splatter paint differently based on touch, business applications 520 may present different application options based on stylus touch pressures, gaming applications 520 may interpret touch pressures differently for different game options, and so on.

The biometric sensor 530 provides scanners for detecting biomarkers of users 402 and 404. Examples of such biomarkers include, without limitation, hand geometry; fingerprints; palm prints; eyes (e.g., iris, retina, pupil, etc.); heart rates; calories burned; oxygen consumed; signature recognition; speech recognition; facial recognition; keystroke dynamics; and the like. The applications may use such biometric sensor data 522 to authenticate users, detect health parameters, provide authorization for actions, recognize gestures, or perform other functions.

The photometer 532 may be used to detect light intensity or other optics. Photometer 532 may include one or more photoresistors, photodiodes, photomultipliers, or other types photo-voltaic components capable of measuring one or more light properties, including, for example but without limitation: light illuminance, irradiance, ambience, absorption, scattering, reflection, fluorescence, phosphorescence, luminescence. The applications 520 may adjust the way content is presented on the displays 102 and 104 based on such light sensor data 522. For example, light detection from the photometer 532 may enable applications 520 or the OS 516 to increase or decrease display levels (e.g., contrast, brightness, etc.) individually on the displays 102 and 104 based on their detected light.

The gyroscope 536 is used to detect movement through gyroscopic rotation (e.g., roll, pitch, and yaw) and the speed of movement. The gyroscope 536 may work alone or in conjunction with the accelerometer 524 to determine the acceleration or speed of movement of the dual-screen computing device 100. Acceleration and speed of movement sensor data 522 may be considered by the applications 520 when determining content to present on either of the displays 102 and 104. Also, the gyroscopic rotation information from the gyroscope 536 may be used—alone or with the orientation and location information from the rotational vector 538 described below—to determine which display 102 and 104 is facing toward or away from the nearby smart device. For instance, it may be helpful for a teacher facing a television that is behind a student to have a reference image and the student's input thereon shown on the television while the user is working.

The orientation and location of the dual-screen computing device 100 may alternatively or additionally be sensed using a rotational vector sensor 538. The rotational vector sensor 538 may be configured to detect rotational vector components along the x, y, and/or z axes, calculating the orientation of the dual-screen computing device 100 as a combination of an angle (θ) around an axis (x, y, z). For example, the rotational vector components may be calculated in the following manner:

$$\text{Vector}(x) = x * \sin(\theta/2)$$
$$\text{Vector}(y) = y * \sin(\theta/2)$$
$$\text{Vector}(z) = z * \sin(\theta/2)$$

Where the magnitude of the rotation vector is equal to sin (θ/2), and the direction of the rotation vector is equal to the direction of the resultant axis of rotation. These three vector components may be used by the rotational vector sensor 538 to determine the orientation and location of the dual-screen computing device 100. Various applications 520 may use such orientation and location information to change content presented on the displays 102 and 104

The GPS sensor 540 may be used to detect the location and movement of the dual-screen computing device 100. The GPS sensor 540 may include an integrated antenna along with various filters, radio frequency shields, and internal processor. In operation, the GPS sensor 540 detects x and y coordinates, and the applications 520 may use such coordinates to geographically locate and track movement of the dual-screen computing device 100.

The sensors 512 capture and produce the sensor data 522 that is stored in the computer-storage memory 508. This sensor data 522 may include the acceleration force information from the accelerometer 524, the magnetic field information from the magnetometer 526, the pressure information form the pressure sensor 528, the detected biomarkers from the biometric sensor 530, the optical data (e.g., light intensity) from the photometer 532, the hinge data (e.g., distance, position, or angular degree that the hinges 106A,B have moved), gyroscopic rotation from gyroscope 536, orientation and location information from the rotational vector 538, or geographic coordinates from the GPS sensor 540. Other sensors 512 capturing different sensor data 522 may be used as well.

In some examples, the applications 520 use the sensor data 522 in their operations and, again, may operate differently based on the detected mode of operation 544. For instance, applications 520 may behave differently, be displayed differently, or have different options based on the mode of operation 544 and the environment, orientation, inputs, or other information detected by the sensors 512.

FIGS. 6-15 show different UIs of applications 520 being run on the dual-screen computing device 100 while in tent mode to illustrate the interaction between content displayed on the two displays 102 and 104. These applications 520 and UIs are provided to explain how some specific embodiments of applications 520 use the dual-screen computing device 100 in tent mode.

Figure 6:
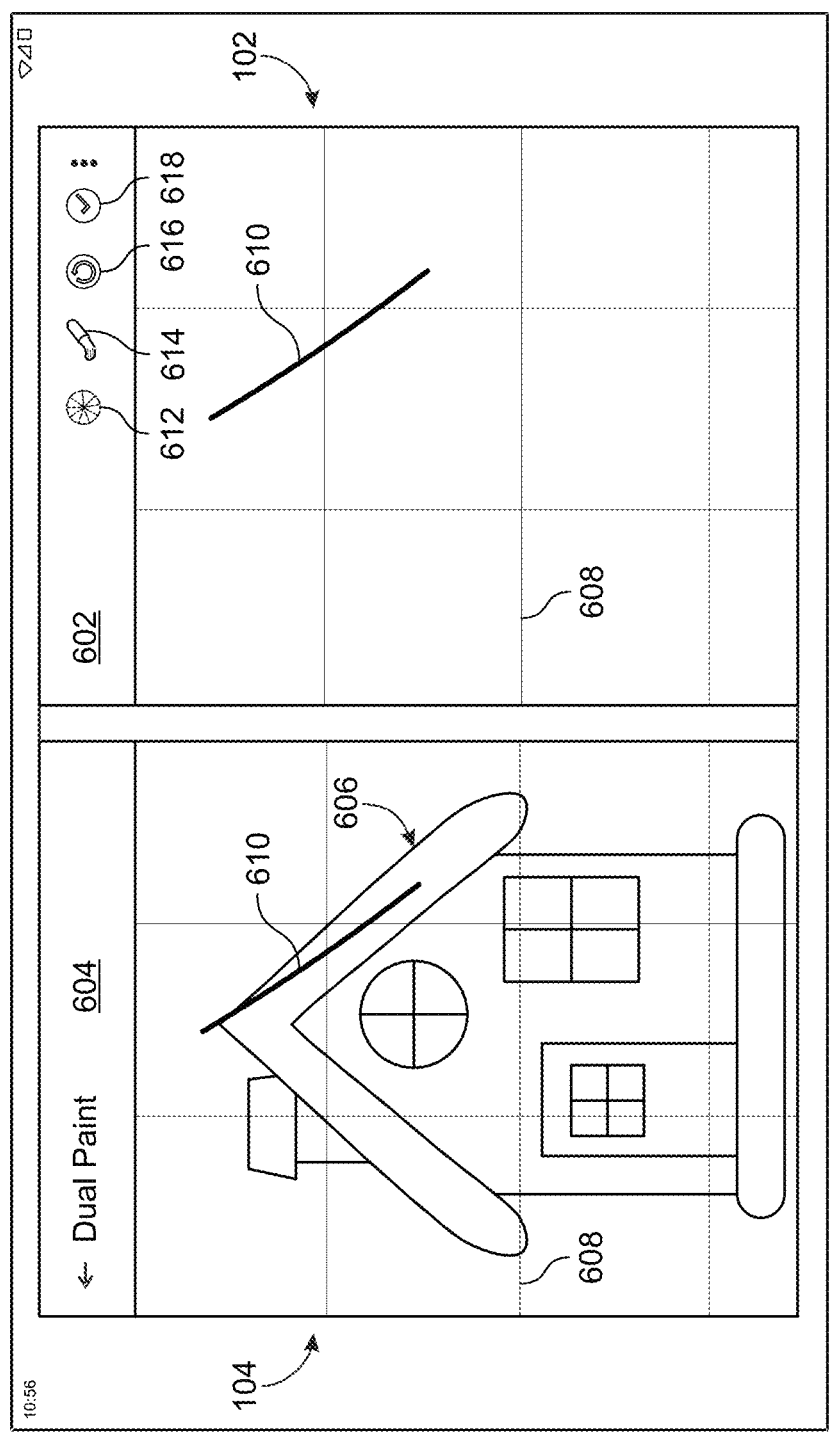
FIGS. 6-15 illustrate various user interfaces (UIs) of applications presented on different displays of a dual-screen computing device.

FIG. 6 illustrates UIs of a paint application 520 running on the dual-screen computing device 100 while in tent mode. The depicted paint application 520 displays UI 602 on display 102 (for user 402) and UI 604 on display 104 (for user 404). This paint application is ideal for a teacher (user 404) explaining an image of a house 606 to a student (user 402) who, in turn, tries to draw the house 606. Because the dual-screen computing device 100 is in tent mode, the teacher and student only see their own displays 104 and 102, respectively.

On the display 104 of the teacher, the full image of the house 606 is shown with a drawing grid 608 overlaid thereon. The drawing grid 608 is also mirrored and overlaid the digital blank drawing canvas in the UI 602 of the display 102. The drawing grid 608 represents just one overlay that may be applied and is not applied in all embodiments.

The teacher may describe the house 606 to the student, instructing the student how to draw the house 606. The drawing grid 608, when overlaid, provides a frame of reference that helps the teacher describe how to draw the house 606. The student draws the house 606 in the blank drawing canvas of the UI 602 through touch or another input. For example, the student may use a finger, stylus, mouse, or other input device. The UI 602 shows the drawing of the student, which is represented as paint input 610. This paint input 610 is mirrored and displayed in real time to the teacher in UI 604 as an overlay on top of the displayed house 606 and drawing grid 608. Thus, the teacher is able to immediately evaluate the student on a separate display 104 in real time and give praise, encouragement, and/or corrective guidance.

In some embodiments, the paint application 520 provides machine-evaluation instead of relying on teacher instruction to both describe the house 606 to the student and evaluate their drawing. Such embodiments describe the house 606 through verbal instructions provided by the paint application 520. The paint application 520 compares the paint input 610 from the student to the image of the house 606, evaluates whether the paint input 610 is within a margin of error (e.g., 5% away from the lines) and provides verbal feedback to correct or praise the student. Other applications 520 may similarly provide machine-generated instructions to users on completing various application tasks. Other embodiments use a digital assistant (e.g., the CORTANA®-branded assistant developed by the MICROSOFT CORPORATION®) to provide the user with instructions.

The paint application 520 provides the student several paint options 612-618. Color option 612 allows the student to change paint or drawing colors. Brush option 614 allows the student to change brushes or drawing instruments. Undo option 616 allows the student to delete the last drawing input. Evaluation option 618 allows the student to check their drawing against the image of the house 606 on the teacher's display 104. Additional options are used in other embodiments.

Figure 7:
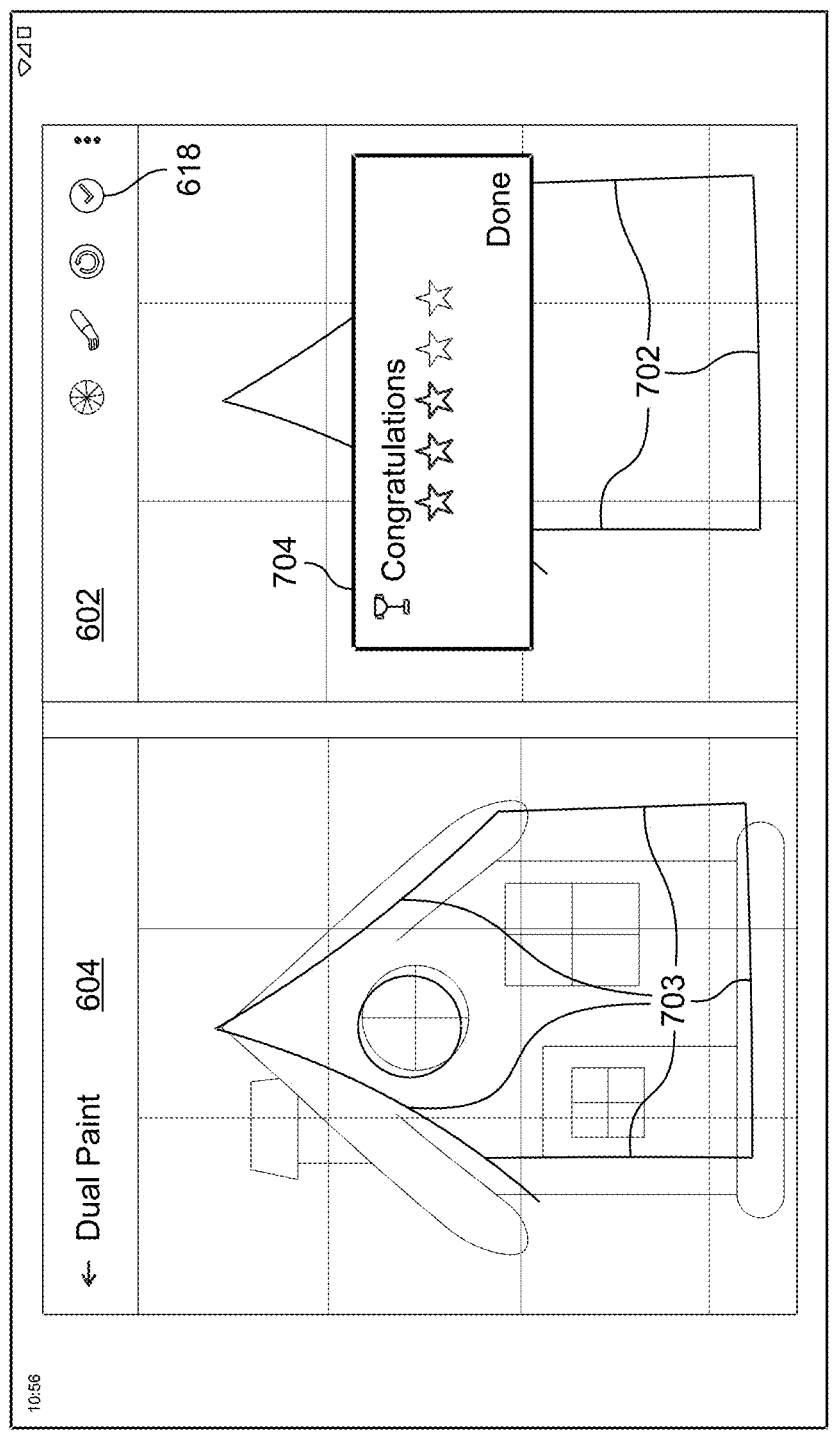

FIG. 7 illustrates UIs of the paint application 520 evaluating the student's drawing 702 of the house 606. This evaluation may be triggered by selecting the evaluation option 618. The application 520 compares the drawing 702 to the house 703 and provides feedback 704 to the student. This feedback 704 may be a rating of how accurately the student drew the house.

Figure 8:
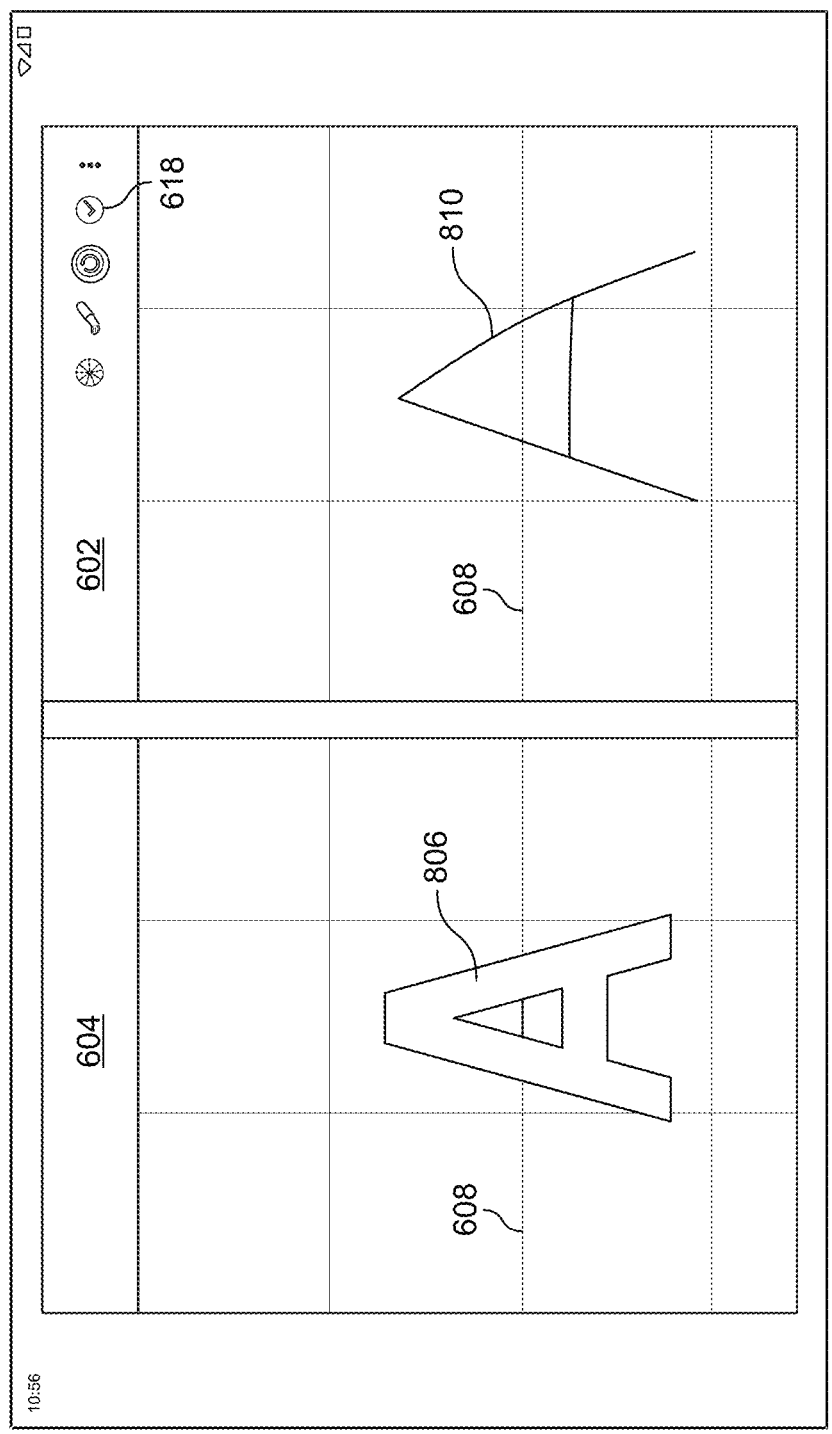

FIG. 8 illustrates another example of the paint application 520 running on the dual-screen computing device 100 while in tent mode, but this time the teacher is instructing the student on how to draw letter 806. The depicted paint application 520 displays UI 602 on display 102 (for user 402) and UI 604 on display 104 (for user 404). The drawing grid 608 is overlaid on an image of the letter 806 being displayed to the teacher on the display 104. The same drawing grid 608 is overlaid on the UI 602 to the student, providing reference points that are mirrored to both users. In this example, the student's drawing input 810 is now shown on the teacher's display 104. Rather, the student may select the evaluation option 618 from a set of options to compare the drawing input 810 to the letter 806 and provide feedback. Thus, some examples mirror paint or drawing inputs to the other display (104), while others do not.

Figure 9:
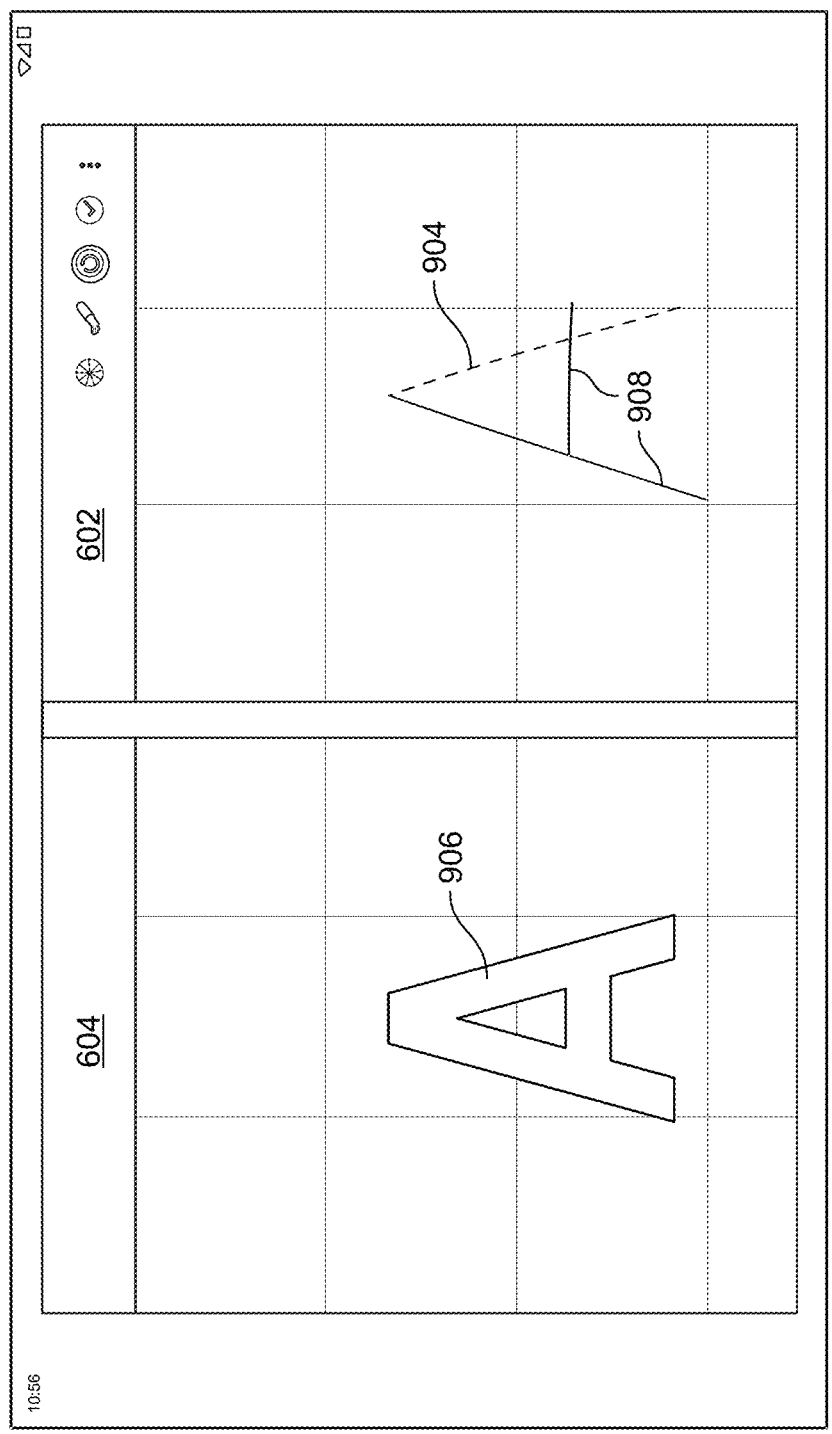

FIG. 9 illustrates another example of the paint application 520 providing a trace-by-numbers project on the dual-screen computing device 100 while in tent mode. In this example, a complete image 906 is shown on the teacher's display 104, and the student is shown hints, corrections, or other indicators to draw the complete image 906 on display 102. A hint 904 is shown as dotted lines instructing the student how to finish drawing the complete image 906. In some examples, the hint 904 is shown to the student in display 102 when machine-evolution in an application 520 detects that the student is not able to follow instructions that are provided.

The student's drawing input 908 is captured on the display 102 and mirrored to the teacher's display 104, showing the student's work in real time.

Figure 10:
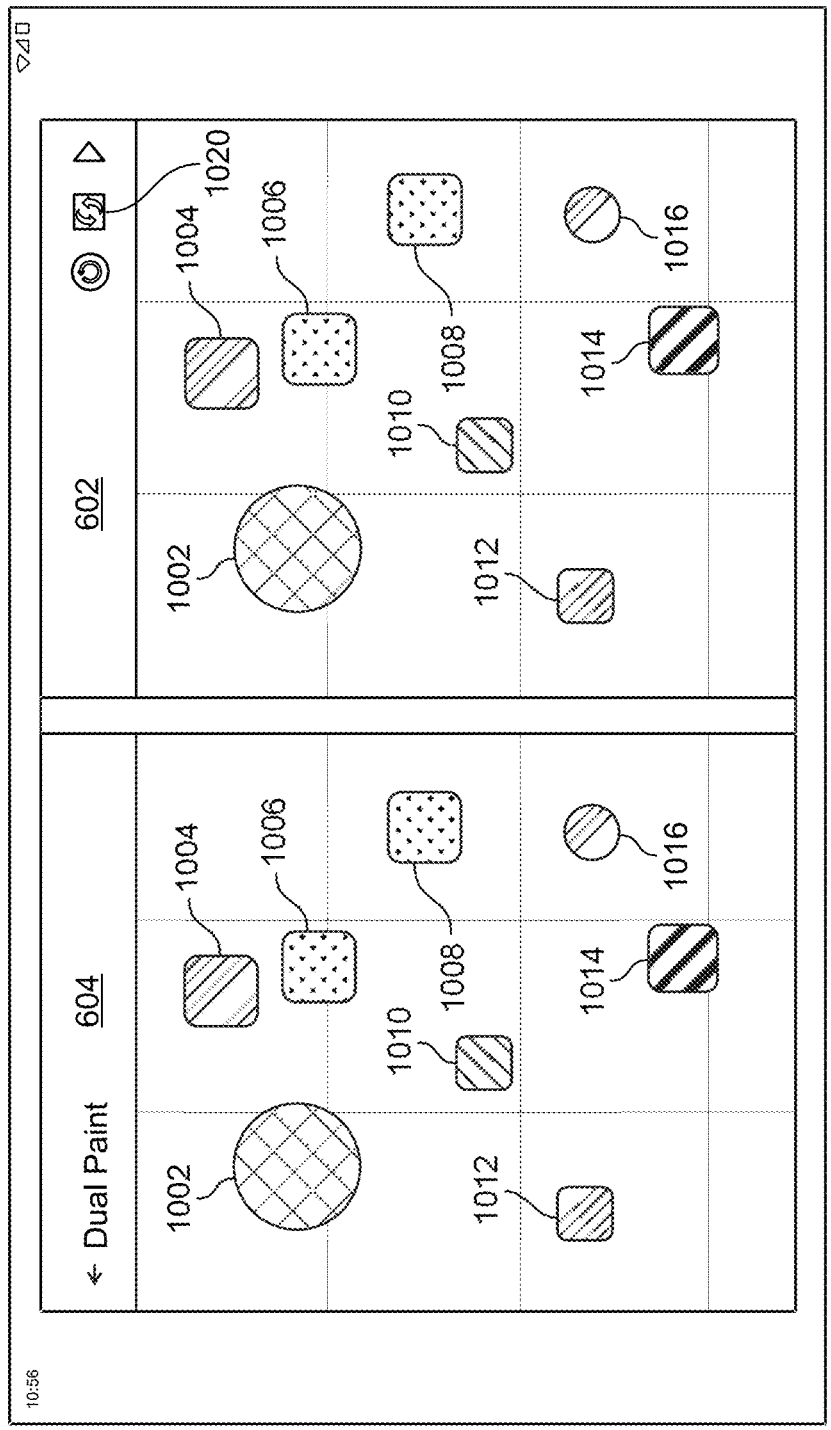
Figure 11:
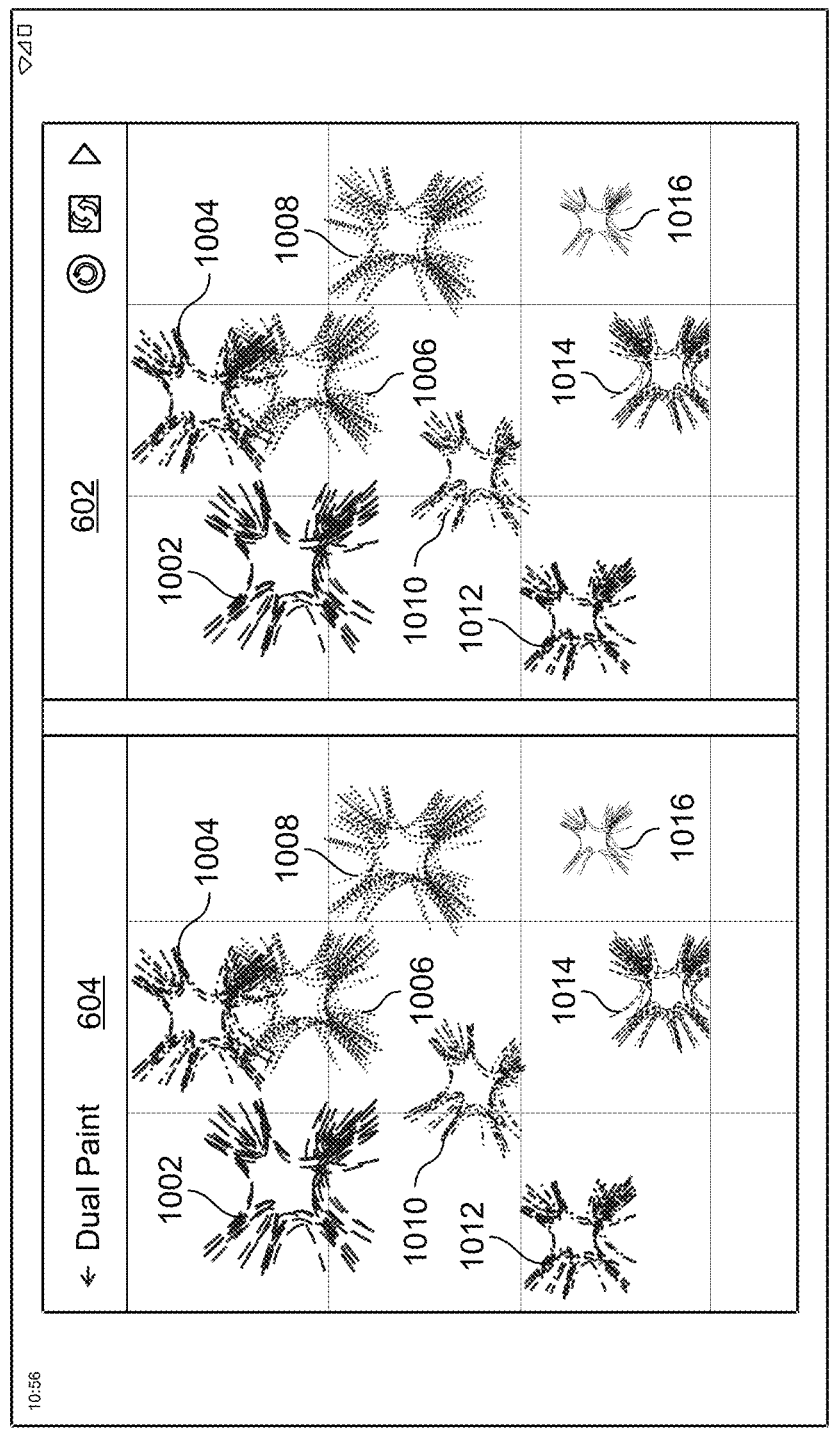

FIG. 10 illustrates another example of the paint application 520 for the tent mode of operation. This example shows a user inputting paint objects 1002-1016 on one of the UIs 602/604, and the paint objects 1002-1016 are mirrored to the other UI 604/602. The user may "smash" the paint objects 1002-1016 by either clicking a close option 1020 or by physically closing the dual-screen computing device 100 through folding the displays 102 and 104 together. Once closed, the paint objects 1002-1016 are displayed as if they were splattered, as shown in FIG. 11. The splattering may occur based on data from the hinge sensor. For example, the splattering may be affected by the hinge sensor data indicating that the two displays were moved slowly or quickly (e.g., more or maximum splattering if the displays were moved quickly, and less or minimum splattering if the displays were moved slowly).

Figure 12:
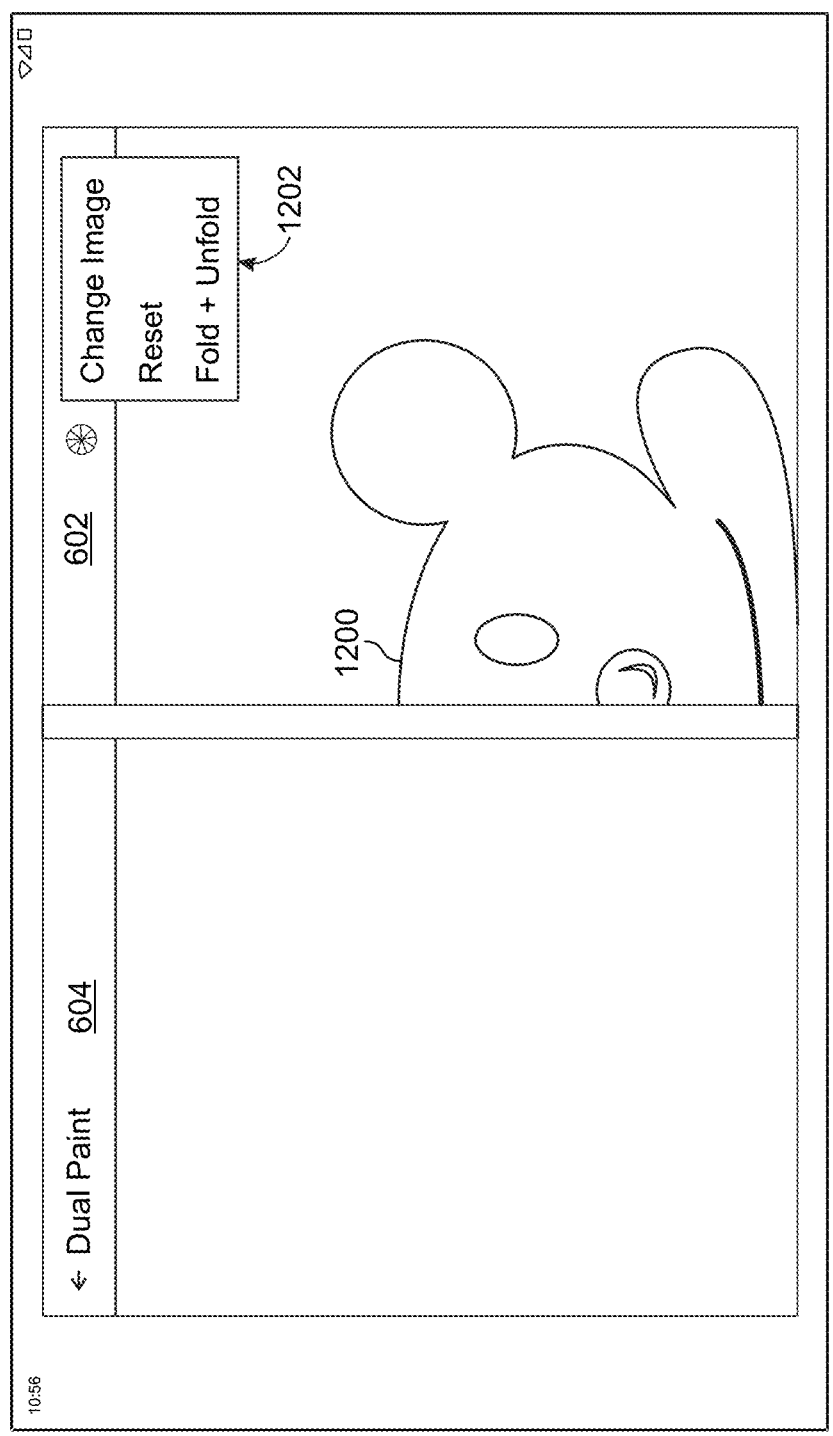
Figure 13:
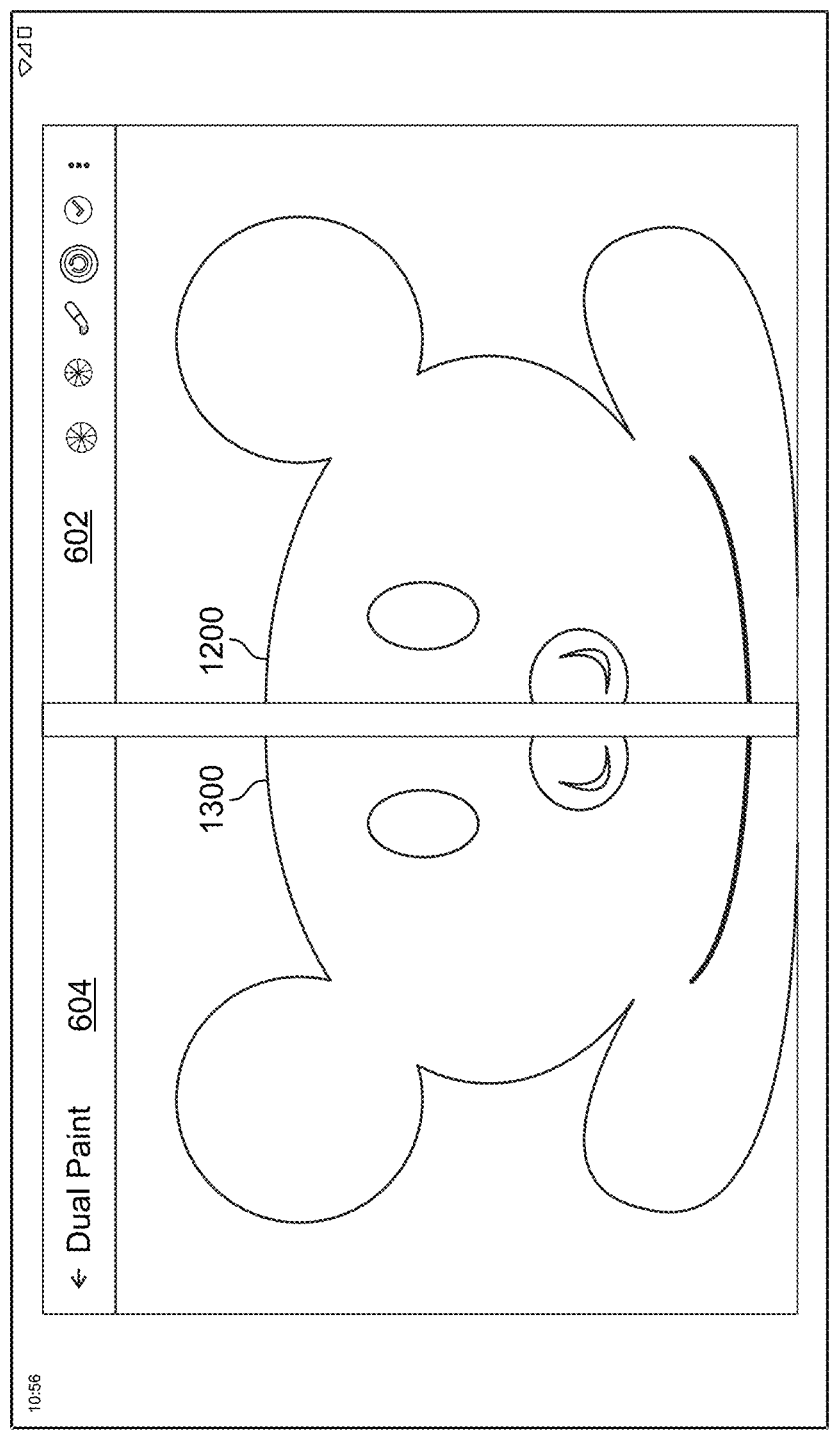

FIGS. 12-13 illustrate another example of the paint application 520 for flat, open, or tent modes of operation. This example shows how the dual-screen computing device 100 is able to mimic paper being folded and unfolded. In FIG. 12, the depicted example shows a user drawing an image 1200 in UI 602 and having the ability to select a folding option 1202. Alternatively, the folding option 1202 may be triggered by the user folding and unfolding the displays 102 and 104 together (as determined by the hinge sensor data), instead of by selecting a menu option. In such embodiments, the dual-screen computing device 100 identifies a folding action by monitoring the previously discussed hinge data 546. However triggered, the folding option 1202 instructs the paint application 520 to inversely mirror or copy the drawn image 1200 on the other UI 604, producing mirrored image 1300, as shown at FIG. 13. Together, the drawn image 1200 and the mirrored image 1300 produce an entire image on the two displays 102 and 104. The resulting image depends on the blend of original color of images on either side, the speed of the fold operation. The resulting image on both sides may differ based on the light exposure to each side, as determined from photometer 532 sensor 512.

Figure 14:
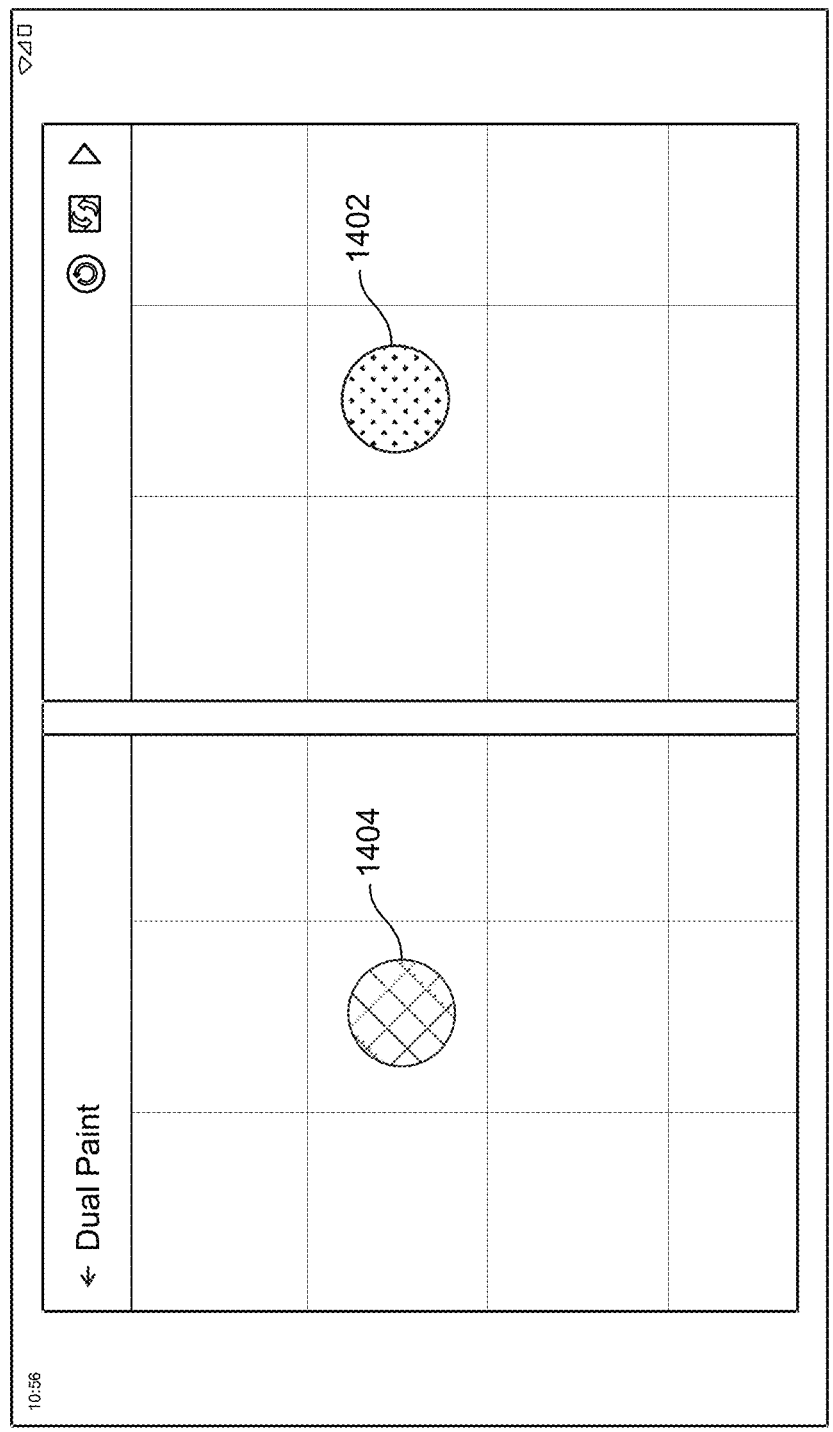
Figure 15:
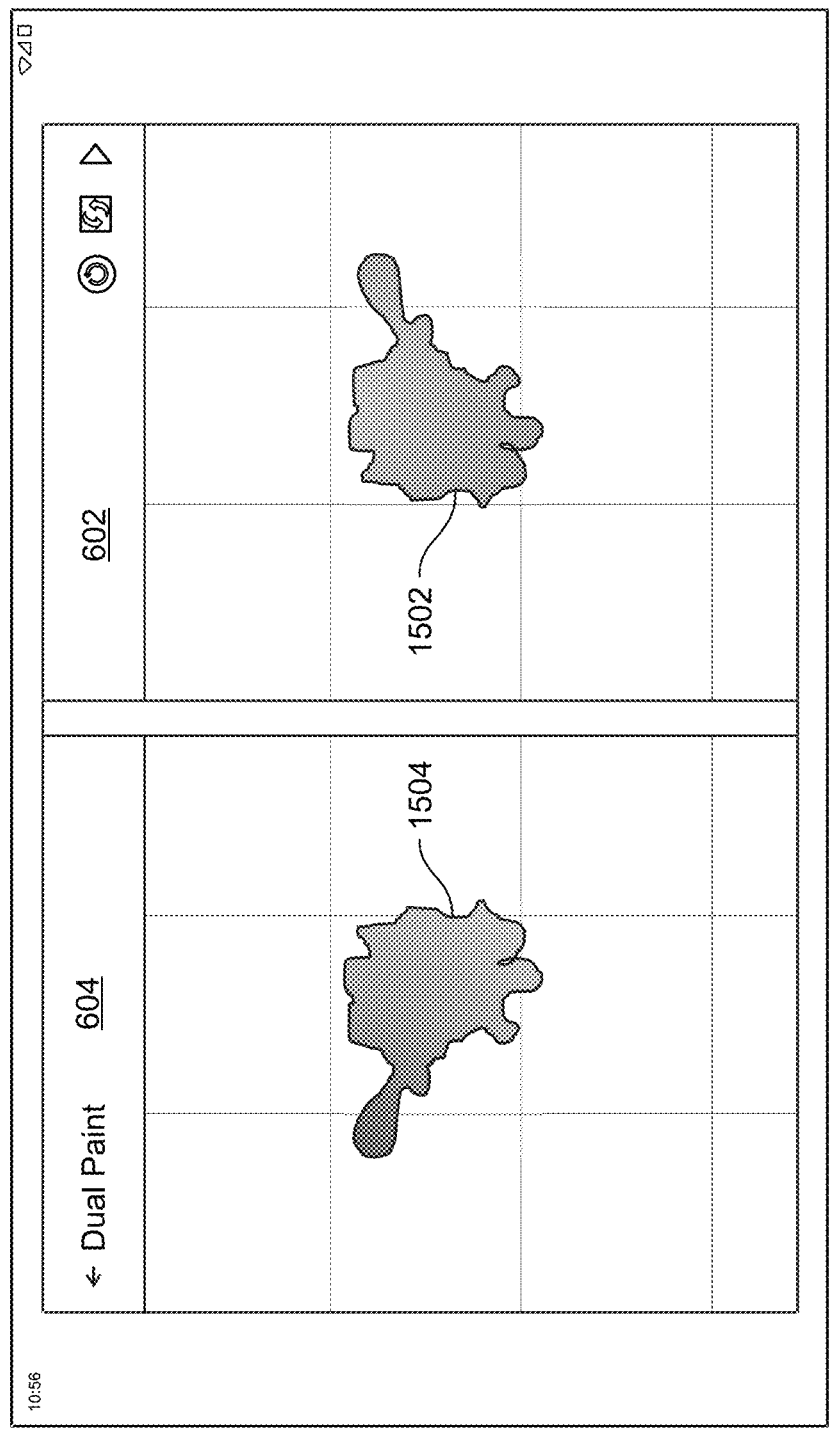

FIGS. 14-15 illustrate another example of the paint application 520 for flat, open, or tent modes of operation. This example shows how the dual-screen computing device 100 is able to mimic paper being folded and unfolded. In FIG. 14, the depicted example shows a user dropping two paint drops 1402 and 1404 on the separate displays 102 and 104, respectively. The paint drops 1402 and 1404 may be different colors, as indicated by the different patterns shown. For example, drop 1402 may be yellow, and drop 1404 may be red. When the displays 102 and 104 are folded together—whether physically or through a folding option—the two paint drops 1402 are shown as splatters of both colors. This is illustrated in FIG. 15, where paint splatters 1502 and 1504 are shown as blended splatters of the paint drops 1402 and 1404. For example, splatters 1504 and 1502 may each be blended colors of the red and yellow paint drops 1402 and 1404, but with varying blended amounts based on the color of the paint drop 1402 or 1404 on the display 102 and 104. For instance, splatter 1502 may have more yellow than splatter 1504 because paint drop 1402 on display 102 was yellow. Similarly, splatter 1504 may have more red than splatter 1502 because paint drop 1404 on display 104 was red. Thus, the paint drops 1402 and 1404 may be blended together and shown as blended splatters 1502 and 1504, respectively, when the dual-screen computing device 100 is detected to be folded together (e.g., by the sensors 512) or when a folding option is selected). Additionally or alternatively, the blending of the colors from the paint drops 1402 may be influenced by the sensors 512. For example, the blending may differ based on the light exposure, speed of closure, pressure, rotation, acceleration, or other type of sensor data 522.

This example also be mimicking the Rorschach Paint effect, where a colorful art is produced with paper, colors and a thread. After placing colorful drops on the either screen, user can use the touch gesture on either of the screen or any other touch sensitive on back/side of the device to create a virtual thread being layout. After that, user can use the folding and unfolding gesture to produce an art like Rorschach Paint. Paint propagation can be dependent on surface angle and gravity direction or other senor inputs. Image lighting can be dependent on surface angle and gravity direction or other senor inputs.

Figure 16:
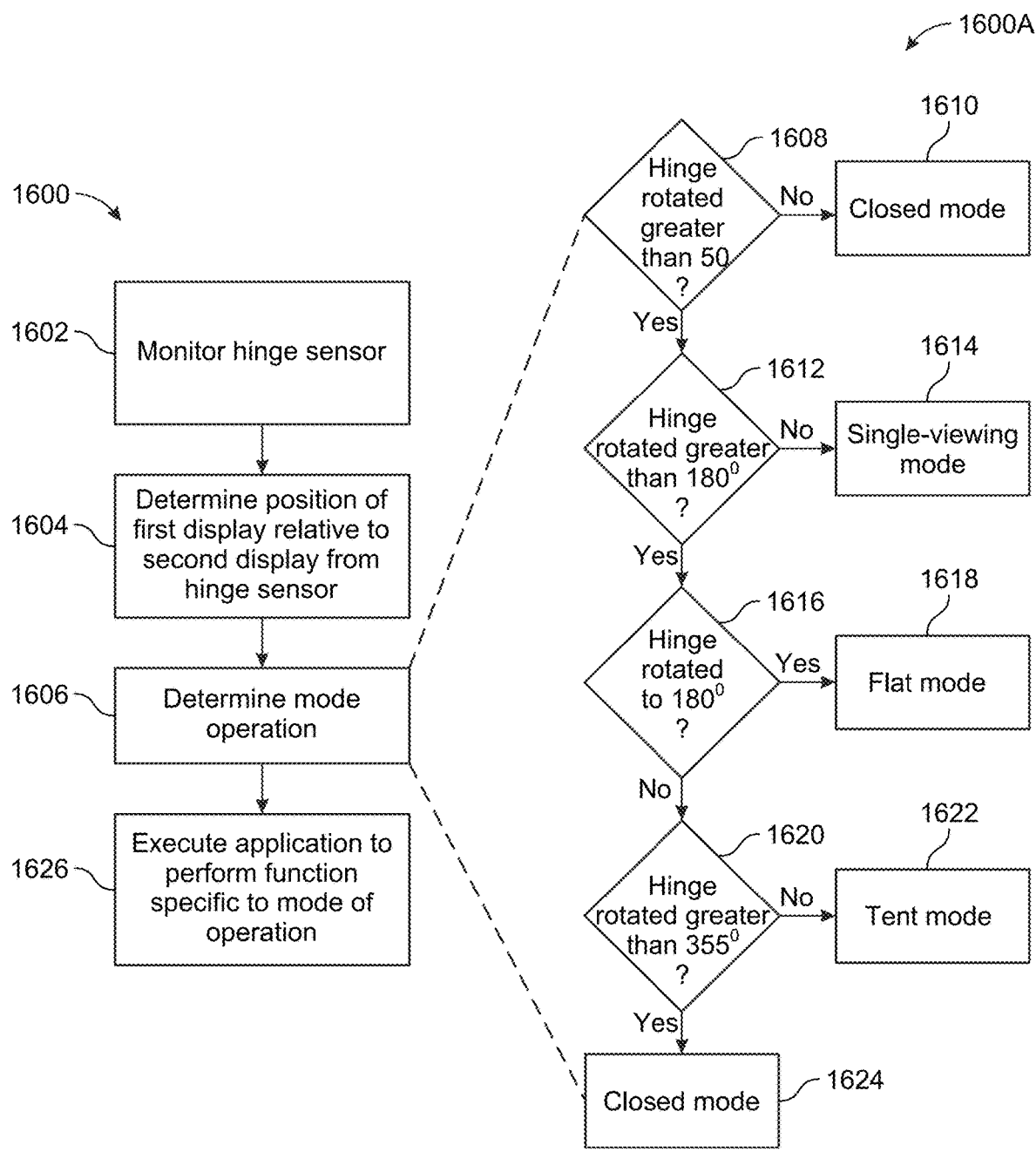
FIG. 16 illustrates a flowchart diagram of a workflow for operating a dual-screen computing device.

FIG. 16 illustrates a flowchart diagram of a workflow 1600 for operating the dual-screen computing device 100. As shown at 1602, the dual-screen computing device 100 monitors the hinge sensor to determine the position or movement of the hinge(s) 106A,B. The position of the first display 102 relative to the second display 104 is determined based on the position or movement of the hinge 106A,B, as shown at 1604. A mode of operation for the dual-screen computing device 100 is determined based on the position of the displays 102 and 104, as shown at 1606.

Workflow 1600A expands on how the mode of operation is determined. In short, the angle of hinge 106A,B being monitored is used to determine the angle of rotation between the two displays 102 and 104. As shown at 1608, if the angle is not greater than 5° (i.e., less), the closed mode is detected, as shown at 1610. The angle is checked to see whether the angle exceeds 180°, as shown at 1612. If the angle is between 5°-180°, the single-viewing mode is detected, as shown at 1614. If the angle is greater than 5°, the angle is checked to see whether the angle equals, or substantially equals, 180°, as shown at 1616, and if so, the flat mode is detected, as shown at 1618. If the angle is greater than 180°, the angle is checked to see whether the angle is less than 355°, as shown at 1420. If so, the tent mode is detected, as shown at 1622, but if not, the closed mode is detected, as shown at 1424.

Once the mode of operation is determined from the hinge 106A,B position or movement, an application may be executed to perform functions that are specific to the mode of operation, as shown at 1626. For example, the above paint applications 520 of FIGS. 6-15 may be presented in different UIs on different displays 102 and 104 while the dual-screen computing device 100 is in tent mode. Additionally, the various sensors 512 and corresponding sensor data 522 may also be used by the applications 520 that are running specifically according to the determined mode of operation. For example, a video shown in tent mode may wirelessly transmit or communicate video content on one display 102 to another computing device (e.g., smart television) detected by a magnetometer 526 and that is in the viewing direction 302 of the display, as detected by a rotational vector sensor 538.

Figure 17:
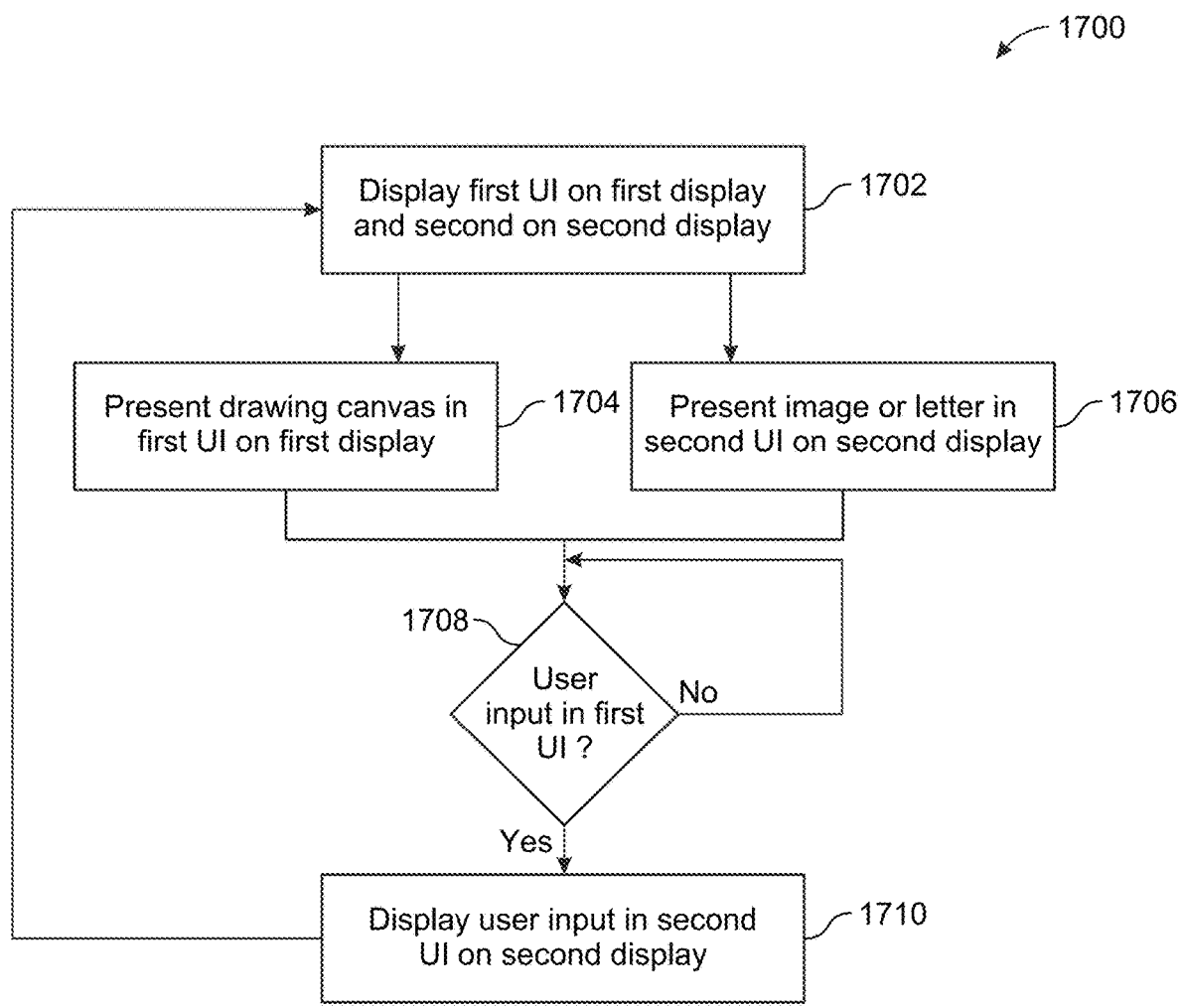
FIG. 17 illustrates a flowchart diagram of a workflow for operating a paint application on a dual-screen computing device.

FIG. 17 illustrates a flowchart diagram of a workflow 1700 for operating a paint application 520 on the dual-screen computing device 100 while in tent mode. As shown at 1702, the application 520 displays a first UI on a first display and a second UI on a second display. On the first display, a drawing canvas for a drawing user to digitally or paint is presented, as shown at 1704. On the second display, an image or letter is presented for an instructing user to view, without or without a drawing grid, as shown at 1706. While open, the application 520 waits for a user input in the first UI on the first display, as shown at 1708. When the drawing user draws (or enters a user input), the user input is displayed in the second UI on the second display, as shown at 1710.

Other applications 520 do not pass inputs between the separate displays 102 and 104 while the dual-screen computing device 100 operates in tent mode. One particular example executes a game as application 520 where an instruction manual is displayed to a user on one display (e.g., to the user 402 on the display 102) while a puzzle—or set of puzzles—that require info from the instruction manual to solve are displayed to another user on the other display (e.g., to the user 404 on the display 404). The users have to communicate back and forth to solve the puzzle(s), without inputs being passed to the displays 102,104. For example, the user being shown the manual must read the manual and verbally describe hints or clues to the other user trying to solve the puzzle. Having the dual-screen computing device 100 in tent mode provides a way to hide the relevant information of the manual from the user trying to solve the puzzle.

Similarly, another application 520 may provide written instructions for an experiment to an "instructing" user on one display (e.g., to the user 402 on the display 102) and a virtual lab environment to a "performing" user on the other display (e.g., to the user 404 on the display 404). Such an application 502 requires the first user to explain the steps of the experiment to the second user, who then must carry out the experiment in the virtual lab environment without actually seeing the instructions. The virtual lab environment may simulate different physical, chemical, biological, or other materials and equipment to show the performing user how the experiment is progressing. This sort of collaborative environment teaches the performing user a scientific lesson through simulation of the experiment and also teaches the instructing user how to teach the experiment to a student, which is quite beneficial to instructors with little teaching experience.

The previously discussed examples are not meant to be an exhaustive list of all different use cases and applications 520. Myriad other applications are fully contemplated by the embodiments and examples disclosed herein.

Additional Examples

Some examples are directed to one or more computer-storage memory devices comprising executable instructions operating a dual-screen computing device comprising a first display and a second display that are both coupled to a hinge. The one or more computer-storage memory devices includes: a hinge sensor configured to monitor movement of the hinge for use in determining a position of the first display relative to the second display; a mode detector configured to determine the dual-screen computing device is operating in a tent mode of operation based on the position of the first display relative to the second display; and an application configured to perform at least one function in a manner that is specific to the tent mode of operation of the dual-screen computing device, wherein the at least one function comprises displaying a user input on the first display to the second display.

In an example scenario, the application comprises a paint application configured to display a blank drawing canvas in a first user interface (UI) on the first display and an image or letter on a second UI on the second display.

In an example scenario, the user input on the first display comprises a touch input from a user that is mirrored on the second display in real time.

In an example scenario, the tent mode of operation is determined based on the hinge being rotated between 190° and 350°.

In some examples, a dual-screen computing device includes: a first display; a second display; a hinge coupled to the first display and to the second display, the hinge defining an axis of rotation for the first display to rotate around the second display; a hinge sensor configured to detect hinge data to determine a position of the first display relative to the second display; computer memory storing an application and instructions for determining a mode of operation based on the position of the first display relative to the second display; and at least one processor programmed to: monitor the hinge sensor to detect the hinge data, determine a position of the first display relative to the second display based on the hinge data detected by the hinge sensor, incident to the mode of operation, execute the application to display a first user interface (UI) on the first display and a second UI on the second display, and display a user input on the first UI on the first display in the second UI on the second display.

In an example scenario, the mode of operation is a tent mode detected based on the first display being positioned more than 180° from the second display.

In an example scenario, the application comprises a paint application and the user input comprises a drawing from a user that is mirrored on the second UI of the second display.

In an example scenario, the application comprises a paint application that displays an image in the second UI on the second display to be drawn by a user in the first UI on the first display.

In an example scenario, one or more additional sensors configured to capture sensor data, and the at least one processor is further programmed to operate the application based, in part, on the sensor data.

In an example scenario, the one or more additional sensors comprise at least one of an accelerometer, a magnetometer, a pressure sensor, a biometric sensor, a photometer, a gyroscope, a rotational vector sensor, or a global positioning system (GPS) sensor.

In an example scenario, the at least one processor is further programmed to: detect an external computing device from sensor data captured by the magnetometer; and wirelessly transmit content in the second UI to the external computing device for display thereon.

In an example scenario, the application comprises a paint application with a feedback option that, when selected, compares the user input to an image and provides feedback on the first display.

In an example scenario, operation of the application in the mode of operation comprises providing a folding option that, when triggered, inversely mirrors the user input on the first UI to the second UI on the second display In an example scenario, the application is configured to present a reference image or letter on the second UI on the second display and the user input received on the first UI on the first display is presented on the second display in conjunction with the reference image or letter.

In an example scenario, the user input is a touch input from a user finger or a stylus.

Other examples are directed to a method for operating a dual-screen computing device comprising a first display and a second display that are both coupled to a hinge. The method includes: monitoring a hinge sensor configured to detect movement of the hinge; determining a position of the first display relative to the second display based on the movement of the hinge detected from the hinge sensor; determining a mode of operation for the dual-screen computing device based on the position of the first display relative to the second display; and executing an application to perform at least one function in a manner that is specific to the mode of operation of the dual-screen computing device, wherein the at least one function comprises a user input on a first user interface (UI) on the first display being displayed on a second UI on the second display.

In an example scenario, a reference image or letter is presented on the second UI on the second display and the user input received is presented on the second display with the reference image or letter.

Another example also includes capturing sensor data from one or more additional sensors and operating the application based, in part, on the sensor data.

In some examples, the operations illustrated in FIGS. 14-15 may be implemented as software instructions encoded on a computer readable medium, in hardware programmed or designed to perform the operations, or both. For example, aspects of the disclosure may be implemented as an SoC or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute exemplary means for operating a dual-screen computing device in different modes of operation based on the position of individual displays. For example, the elements illustrated in FIG. 5, such as when encoded to perform the operations illustrated in FIGS. 14-15, constitute exemplary means for analyzing the hinge position of a dual-screen computing device, exemplary means for determining positions of the displays from the analyzed hinge position, detecting a mode of operation based on the positions of the displays or the hinge position, and execute applications in specific ways based on the detected mode of operation of the dual-screen device.

Having described aspects of the disclosure in detail, modifications and variations are possible without departing from the scope of aspects of the disclosure as defined in the appended claims. As various changes could be made in the above constructions, products, and methods without departing from the scope of aspects of the disclosure, all matter contained in the above description and shown in the accompanying drawings should be interpreted as illustrative and not in a limiting sense.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The subject matter disclosed herein is described with specificity to meet statutory requirements. The description itself is not intended to limit the scope of this patent. Rather, the inventor has contemplated that the claimed subject matter might also be embodied in other ways, to include different steps or combinations of steps similar to the ones described in this document, in conjunction with other present or future technologies. Although the terms "step" and/or "block" may be used herein to connote different elements of methods employed, the terms should not be interpreted as implying any particular order among or between various steps herein disclosed unless and except when the order of individual steps is explicitly described. The order of execution or performance of the operations in examples of the disclosure illustrated and described herein is not essential, unless otherwise specified. The operations may be performed in any order, unless otherwise specified, and examples of the disclosure may include additional or fewer operations than those disclosed herein. It is therefore contemplated that executing or performing a particular operation before, contemporaneously with, or after another operation is within the scope of aspects of the disclosure.

What is claimed is:

1. A computer-storage memory device comprising executable instructions operating a dual-screen computing device comprising a first display and a second display that are both coupled to a hinge, the computer-storage memory device comprising:
    a hinge sensor configured to monitor movement of the hinge for use in determining a position of the first display relative to the second display;
    a mode detector configured to determine the dual-screen computing device is operating in a tent mode of operation based on the position of the first display relative to the second display; and
    an application configured to perform at least one function in a manner based on the tent mode of operation of the dual-screen computing device, wherein the at least one function comprises:
    presenting a reference image on the second display and not on the first display;
    displaying, on the second display, a user input from the first display, the user input being a selection of the at least one function;
    presenting the user input received on the first display on the second display in conjunction with the reference image;
    in response to the hinge sensor determining a folding operation, creating an inverse copy of the reference image; and
    presenting the reference image on the second display and the created inverse copy of the reference image on the first display.

2. The computer-storage memory device of claim 1, wherein the folding operation is detected by the hinge sensor based on hinge data indicating that the first display and the second display are rotated toward each other.

3. The computer-storage memory device of claim 1, wherein creating the inverse copy of the reference image comprises generating a mirrored image of content displayed on the first display.

4. The computer-storage memory device of claim 1, wherein presenting the created inverse copy on the first display and the reference image on the second display mimics a folded-paper effect across the first display and the second display.

5. The computer-storage memory device of claim 1, wherein the reference image is a user drawing input and the application is a paint application configured to display the user drawing input on the first display and to present the inverse copy of the user drawing input on the second display in response to the folding operation.

6. The computer-storage memory device of claim 5, wherein the paint application is further configured to generate the inverse copy as a mirror image across a fold line defined by the hinge.

7. The computer-storage memory device of claim 1, wherein the creating of the inverse copy further comprises inversely copying color data of the reference image displayed on the first display to the second display.

8. The computer-storage memory device of claim 1, wherein the folding operation is detected by comparing a prior hinge angle to a current hinge angle to determine that the hinge is being rotated toward a closed position.

9. The computer-storage memory device of claim 1, wherein the presenting of the created inverse copy is dependent on at least one of:
    a speed of the folding operation, or
    a detected light exposure difference between the first display and the second display.

10. A dual-screen computing device comprising:
    a first display;
    a second display, the first and second display being coupled to a hinge;
    a hinge sensor configured to monitor movement of the hinge for use in determining a position of the first display relative to the second display;
    a mode detector configured to determine the dual-screen computing device is operating in a tent mode of operation based on the position of the first display relative to the second display; and
    an application configured to perform at least one function in a manner based on the tent mode of operation of the dual-screen computing device, wherein the at least one function comprises:
    presenting a reference image on the second display and not on the first display;
    displaying, on the second display, a user input from the first display, the user input being a selection of the at least one function,
    presenting the user input received on the first display on the second display in conjunction with the reference image;
    in response to the hinge sensor determining a folding operation, creating an inverse copy of the reference image; and
    presenting the reference image on the second display and the created inverse copy of the reference image on the first display.

11. The dual-screen computing device of claim 10, wherein the reference image is a user drawing input and the application is a paint application configured to display the user drawing input on the first display and to present the inverse copy of the user drawing input on the second display in response to the folding operation, and wherein the paint application is further configured to generate the inverse copy as a mirror image across a fold line defined by the hinge.

12. The dual-screen computing device of claim 10, wherein the creating of the inverse copy further comprises inversely copying color data of the reference image displayed on the first display to the second display.

13. The dual-screen computing device of claim 10, wherein the folding operation is detected by comparing a prior hinge angle to a current hinge angle to determine that the hinge is being rotated toward a closed position.

14. The dual-screen computing device of claim 10, wherein the presenting of the created inverse copy is dependent on a speed of the folding operation, or a detected light exposure difference between the first display and the second display.

15. The dual-screen computing device of claim 10, wherein the presenting of the created inverse copy is dependent on a detected light exposure difference between the first display and the second display.

16. A computer storage media having computer-readable instructions that, when executed by a processor, cause a dual-screen computing device comprising a first display and a second display coupled to a hinge to perform the following operations:

monitor movement of the hinge for use in determining a position of the first display relative to the second display;

determine the dual-screen computing device is operating in a tent mode of operation based on the position of the first display relative to the second display; and perform at least one function in a manner based on the tent mode of operation of the dual-screen computing device, wherein the at least one function comprises:

presenting a reference image on the second display and not on the first display;

displaying, on the second display, a user input from the first display, the user input being a selection of the at least one function, presenting the user input received on the first display on the second display in conjunction with the reference image;

in response to a hinge sensor determining a folding operation, creating an inverse copy of the reference image; and presenting the reference image on the second display and the created inverse copy of the reference image on the first display.

17. The computer storage media of claim 16, wherein the creating of the inverse copy further comprises inversely copying color data of the reference image displayed on the first display to the second display.

18. The computer storage media of claim 16, wherein the folding operation is detected by comparing a prior hinge angle to a current hinge angle to determine that the hinge is being rotated toward a closed position.

19. The computer storage media of claim 16, wherein the presenting of the created inverse copy is dependent on a speed of the folding operation, or a detected light exposure difference between the first display and the second display.

20. The computer storage media of claim 16, wherein the presenting of the created inverse copy is dependent on a detected light exposure difference between the first display and the second display.

* * * * *